US012600344B2

(12) United States Patent
Sugiyama et al.

(10) Patent No.: US 12,600,344 B2
(45) Date of Patent: Apr. 14, 2026

(54) CARBON DIOXIDE RECOVERY SYSTEM

(71) Applicant: TOYOTA JIDOSHA KABUSHIKI KAISHA, Toyota (JP)

(72) Inventors: Koseki Sugiyama, Sunto-gun (JP); Daiki Yokoyama, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 525 days.

(21) Appl. No.: 17/663,902

(22) Filed: May 18, 2022

(65) Prior Publication Data

US 2023/0025828 A1     Jan. 26, 2023

(30) Foreign Application Priority Data

Jul. 21, 2021     (JP) ................................. 2021-120619

(51) Int. Cl.
| | |
|---|---|
| *B60W 20/16* | (2016.01) |
| *B01D 53/04* | (2006.01) |
| *B01D 53/14* | (2006.01) |
| *B01D 53/62* | (2006.01) |
| *B60W 10/06* | (2006.01) |
| *B60W 10/08* | (2006.01) |

(Continued)

(52) U.S. Cl.
CPC ............. *B60W 20/16* (2016.01); *B01D 53/04* (2013.01); *B01D 53/1475* (2013.01); *B01D 53/62* (2013.01); *B60W 10/06* (2013.01); *B60W 10/08* (2013.01); *B60W 20/12* (2016.01); *B60W 50/14* (2013.01); *B60W 60/001* (2020.02); *B01D 2257/504* (2013.01); *B01D 2258/05* (2013.01); *B60W 2510/244* (2013.01)

(58) Field of Classification Search
None
See application file for complete search history.

(56) References Cited

U.S. PATENT DOCUMENTS

| | | | | |
|---|---|---|---|---|
| 8,392,091 | B2 * | 3/2013 | Hebbale | .................... F01N 9/00 |
| | | | | 60/274 |
| 9,809,214 | B2 * | 11/2017 | Liang | .................... B60W 10/06 |

(Continued)

FOREIGN PATENT DOCUMENTS

| | | | |
|---|---|---|---|
| JP | 2010266204 A | * | 11/2010 |
| JP | 5304424 B2 | | 10/2013 |

(Continued)

OTHER PUBLICATIONS

Translation of JP-2010266204A (Year: 2010).*

*Primary Examiner* — Christopher George Fees

(74) *Attorney, Agent, or Firm* — Oblon, McClelland, Maier & Neustadt, L.L.P.

(57)     ABSTRACT

A carbon dioxide recovery system that recovers carbon dioxide from a hybrid vehicle traveling in a $CO_2$ recovery area including a $CO_2$ recovery road in which a stationary $CO_2$ recovery device collecting and recovering carbon dioxide from the atmosphere is provided acquires a residual charging capacity of the battery and position information of the hybrid vehicle and guides the hybrid vehicle such that the hybrid vehicle travels on the $CO_2$ recovery road using a notification device when the residual charging capacity is equal to or less than a predetermined SOC threshold value while the hybrid vehicle is traveling in the $CO_2$ recovery area.

5 Claims, 11 Drawing Sheets

(51) Int. Cl.
  _B60W 20/12_ (2016.01)
  _B60W 50/14_ (2020.01)
  _B60W 60/00_ (2020.01)

(56) References Cited

U.S. PATENT DOCUMENTS

| | | | | | |
|---|---|---|---|---|---|
| 9,834,199 | B2 * | 12/2017 | Yoon | ................. | G08G 1/09623 |
| 10,407,049 | B2 * | 9/2019 | Blasinski | .............. | B60W 10/26 |
| 11,679,754 | B2 * | 6/2023 | Kang | ................... | B60W 10/06 |
| | | | | | 701/22 |
| 2003/0078707 | A1 * | 4/2003 | Shioda | ................... | B60L 50/16 |
| | | | | | 903/917 |
| 2010/0043404 | A1 * | 2/2010 | Hebbale | ................... | F01N 9/00 |
| | | | | | 60/274 |
| 2010/0274422 | A1 * | 10/2010 | Schrey | .............. | G01C 21/3461 |
| | | | | | 903/903 |
| 2015/0197235 | A1 * | 7/2015 | Yu | ......................... | B60W 10/08 |
| | | | | | 903/903 |
| 2016/0139598 | A1 | 5/2016 | Ichikawa et al. | | |
| 2016/0325726 | A1 * | 11/2016 | Liang | .................... | B60W 10/06 |
| 2018/0056982 | A1 * | 3/2018 | Endo | ..................... | B60W 10/06 |
| 2019/0126907 | A1 * | 5/2019 | Park | ...................... | B60W 20/16 |
| 2019/0126910 | A1 * | 5/2019 | Kim | ..................... | B60W 20/16 |
| 2019/0390970 | A1 * | 12/2019 | Cha | ........................ | B60W 20/00 |
| 2020/0180599 | A1 * | 6/2020 | Kang | ........................ | B60K 6/22 |
| 2021/0001266 | A1 | 1/2021 | Sugiyama et al. | | |
| 2021/0180970 | A1 * | 6/2021 | Park | ........................ | B60L 58/13 |
| 2023/0087055 | A1 * | 3/2023 | Berkooz | .............. | B60W 50/14 |
| | | | | | 701/22 |

FOREIGN PATENT DOCUMENTS

| | | |
|---|---|---|
| JP | 2016-99713 A | 5/2016 |
| JP | 2021-8852 A | 1/2021 |

* cited by examiner

HEV

START

S31

NO — HAS NEW TRAVEL ROUTE BEEN RECEIVED?

YES

S32

NOTIFY OF NEW TRAVEL ROUTE

END

START

S41

NO — IS VEHICLE GOING TO TRAVEL ALONG NEW TRAVEL ROUTE?

YES

S42

TEMPORARILY CHANGE ENGINE-START THRESHOLD VALUE AT WHICH ENGINE IS STARTED

END

FIG. 10

CARBON DIOXIDE RECOVERY SYSTEM

CROSS-REFERENCE TO RELATED APPLICATION

This application claims priority to Japanese Patent Application No. 2021-120619 filed on Jul. 21, 2021, incorporated herein by reference in its entirety.

BACKGROUND

1. Technical Field

The disclosure relates to a carbon dioxide recovery system that collects and recovers carbon dioxide discharged from a vehicle.

2. Description of Related Art

An information management system for accurately totalizing and managing an amount of carbon dioxide ($CO_2$) recovered for each vehicle is described in Japanese Unexamined Patent Application Publication No. 2021-8852 (JP 2021-8852 A). The information management system described in JP 2021-8852 A includes a plurality of external devices mounted in vehicles and configured to transmit and receive information and a server configured to communicate with the plurality of external devices. Each external device transmits an amount of recovered carbon dioxide recovered by the corresponding vehicle in which a $CO_2$ recovery device is mounted to the server. The server is configured to collect and manage amounts of recovered carbon dioxide transmitted from the external devices.

SUMMARY

Each vehicle included in the information management system described in JP 2021-8852 A is a vehicle in which an engine (an internal combustion engine) is mounted and a $CO_2$ recovery device is mounted. The $CO_2$ recovery device is connected to an exhaust pipe of the engine and collects and recovers carbon dioxide from exhaust gas of the engine, for example, using solid adsorption effects of activated carbon or zeolite. Accordingly, it is possible to reduce an amount of carbon dioxide discharged from the engine to the atmosphere while a vehicle is traveling. When such a $CO_2$ recovery device is mounted in all vehicles, it is possible to effectively reduce an amount of carbon dioxide discharged to the atmosphere. However, it is practically difficult to mount such a $CO_2$ recovery device in all vehicles. Therefore, it is conceivable that a $CO_2$ recovery device be installed on a road or facility outside of a vehicle and carbon dioxide be collected and recovered from exhaust gas discharged to the atmosphere. For example, by providing a $CO_2$ recovery device in a place in which exhaust gas is likely to stay such as a road tunnel or an underpass, it is possible to efficiently recover carbon dioxide in exhaust gas. It is also possible to recover carbon dioxide discharged from a vehicle in which a $CO_2$ recovery device is not mounted using such a $CO_2$ recovery device installed outside.

A hybrid vehicle in which an engine and a motor are mounted can allow the engine to operate efficiently and recover and reuse kinetic energy at the time of deceleration or braking through regeneration control of the motor. Accordingly, with the hybrid vehicle, it is possible to curb fuel consumption in the engine and thus to reduce an amount of carbon dioxide discharged from the engine. Due to these effects of high fuel efficiency performance and environmental load reduction having been recognized, hybrid vehicles have become widespread recently. Even in a hybrid vehicle, carbon dioxide along with exhaust gas from an engine is also discharged when the engine operates. While a hybrid vehicle is traveling, an engine thereof operates when a large driving force is required, for example, at the time of acceleration or at the time of traveling on an uphill road or when a residual charging capacity or a state of charge (SOC) of a battery has decreased. However, it is not easy to identify a place or a timing at which the engine will operate while the hybrid vehicle is traveling. Accordingly, it cannot be said that the engine of the hybrid vehicle will be operating at a place in which a $CO_2$ recovery device is installed. When the engine of a hybrid vehicle operates at a place in which a $CO_2$ recovery device is not installed, carbon dioxide along with exhaust gas from the engine is discharged to the atmosphere.

There is room for improvement in effectively reducing an amount of carbon dioxide discharged from a hybrid vehicle with excellent effects of high fuel efficiency performance and environmental load reduction.

The disclosure provides a carbon dioxide recovery system that can effectively reduce an amount of carbon dioxide discharged from a hybrid vehicle to the atmosphere.

According to an aspect of the disclosure, there is provided a carbon dioxide recovery system that recovers carbon dioxide discharged from an engine (an internal combustion engine) of a hybrid vehicle, which includes a plurality of power sources including the engine and a motor and a battery transmitting and receiving electric power to and from the motor, the carbon dioxide recovery system recovering carbon dioxide from the hybrid vehicle traveling in a $CO_2$ recovery area including a $CO_2$ recovery road in which a stationary $CO_2$ recovery device collecting and recovering carbon dioxide from the atmosphere is provided, wherein the hybrid vehicle includes: a control unit configured to acquire at least a residual charging capacity (or a numerical value indicating a state of charge) of the battery and position information of the hybrid vehicle and to control an operation of the engine; and a notification device configured to notify a driver of the hybrid vehicle of information output from the control unit, and wherein the control unit is configured to guide the hybrid vehicle such that the hybrid vehicle travels on the $CO_2$ recovery road using the notification device when the residual charging capacity is equal to or less than a predetermined SOC threshold value or when the residual charging capacity is predicted to be equal to or less than the SOC threshold value while the hybrid vehicle is traveling in the $CO_2$ recovery area.

According to another aspect of the disclosure, there is provided a carbon dioxide recovery system that recovers carbon dioxide discharged from an engine (an internal combustion engine) of a hybrid vehicle, which includes a plurality of power sources including the engine and a motor and a battery transmitting and receiving electric power to and from the motor, the carbon dioxide recovery system recovering carbon dioxide from the hybrid vehicle traveling in a $CO_2$ recovery area including a $CO_2$ recovery road in which a stationary $CO_2$ recovery device collecting and recovering carbon dioxide from the atmosphere is provided, wherein the hybrid vehicle is an automated driving vehicle that is able to travel, for example, based on a predetermined travel plan by automated driving for enabling the hybrid vehicle to travel under automatic control of a driving operation, wherein the hybrid vehicle includes a control unit configured to acquire at least a residual charging capacity (or a numerical value indicating a state of charge) of the battery and position information of the hybrid vehicle and to control the driving operation and an operation of the engine, and wherein the control unit is configured to control the hybrid vehicle such that the hybrid vehicle travels on the $CO_2$ recovery road (for example, to set or change the travel plan such that the hybrid vehicle travels on the $CO_2$ recovery road) when the residual charging capacity is equal to or less than a predetermined SOC threshold value or when the residual charging capacity is predicted to be equal to or less than the SOC threshold value while the hybrid vehicle is traveling in the $CO_2$ recovery area by the automated driving.

In the aspect of the disclosure, the control unit may be configured to operate the engine and to charge the battery by causing the motor to generate electric power while the hybrid vehicle is traveling on the $CO_2$ recovery road.

In the aspect of the disclosure, the control unit may be configured to operate the engine and to charge the battery by causing the motor to generate electric power when the residual charging capacity is equal to or less than an engine-start threshold value and temporarily decrease the engine-start threshold value until the hybrid vehicle reaches the $CO_2$ recovery road when the hybrid vehicle is traveling to the $CO_2$ recovery road after the residual charging capacity has become equal to or less than the SOC threshold value or after the residual charging capacity has been predicted to be equal to or less than the SOC threshold value while the hybrid vehicle is traveling in the $CO_2$ recovery area.

According to another aspect of the disclosure, there is provided a carbon dioxide recovery system that recovers carbon dioxide discharged from an engine (an internal combustion engine) of a hybrid vehicle, which includes a plurality of power sources including the engine and a motor and a battery transmitting and receiving electric power to and from the motor, the carbon dioxide recovery system recovering carbon dioxide from the hybrid vehicle traveling in a $CO_2$ recovery area including a $CO_2$ recovery road in which a stationary $CO_2$ recovery device collecting and recovering carbon dioxide from the atmosphere is provided, wherein the hybrid vehicle includes a human-machine interface (HMI) device configured to enable the hybrid vehicle and a driver of the hybrid vehicle to transmit and receive information and signals and includes a notification unit configured to notify the driver of predetermined information (or to allow the driver to recognize predetermined information), and wherein the HMI device is configured to acquire at least a residual charging capacity (or a numerical value indicating a state of charge) of the battery and position information of the hybrid vehicle and to notify the driver of information for guiding the hybrid vehicle such that the hybrid vehicle travels on the $CO_2$ recovery road when the residual charging capacity is equal to or less than a predetermined SOC threshold value or when the residual charging capacity is predicted to be equal to or less than the SOC threshold value while the hybrid vehicle is traveling in the $CO_2$ recovery area.

The carbon dioxide recovery system according to the aspects of the disclosure recovers carbon dioxide discharged from a hybrid vehicle traveling in a $CO_2$ recovery area. In the $CO_2$ recovery area, a $CO_2$ recovery road including a stationary $CO_2$ recovery device is provided, and carbon dioxide discharged from an engine of a hybrid vehicle is collected and recovered by the stationary $CO_2$ recovery device when the hybrid vehicle is traveling on the $CO_2$ recovery road. In general, a hybrid vehicle does not discharge carbon dioxide in a state in which an engine is stopped and it is traveling with a driving force generated with an output torque of a motor. On the other hand, when the residual charging capacity of the battery decreases, the hybrid vehicle operates the engine and charges the battery by generating electric power using the motor. At this time, carbon dioxide is discharged along with exhaust gas of the engine. Therefore, in the carbon dioxide recovery system according to the disclosure, the residual charging capacity of the battery is monitored and control is performed such that the hybrid vehicle travels to the $CO_2$ recovery road when the residual charging capacity of the battery is equal to or less than the predetermined SOC threshold value or when the residual charging capacity of the battery is predicted to be equal to or less than the predetermined SOC threshold value. That is, when the residual charging capacity of the battery decreases and the engine needs to operate to charge the battery, it is possible to cause the hybrid vehicle to travel to the $CO_2$ recovery road beforehand (before the engine is actually operated).

For example, when the residual charging capacity of the battery in the hybrid vehicle traveling in a $CO_2$ recovery area is equal to or less than the SOC threshold value or when the residual charging capacity of the battery is predicted to be equal to or less than the SOC threshold value, the carbon dioxide recovery system according to the disclosure notifies an occupant (a driver) of the hybrid vehicle of information or an instruction for prompting the hybrid vehicle to travel on a $CO_2$ recovery road using the notification device. Accordingly, the hybrid vehicle is guided to travel on the $CO_2$ recovery road. As a result, with the carbon dioxide recovery system according to the disclosure, it is possible to guide a hybrid vehicle in which the residual charging capacity of the battery has decreased and the engine needs to be operated such that the hybrid vehicle travels on a $CO_2$ recovery road beforehand. Accordingly, it is possible to operate the engine when the hybrid vehicle travels on a $CO_2$ recovery road and to efficiently recover carbon dioxide discharged from the engine at that time on the $CO_2$ recovery road.

Alternatively, when the hybrid vehicle is, for example, an automated-driving vehicle which is automatically driven based on a travel plan (a scheduled travel route), the carbon dioxide recovery system according to the disclosure may perform control such that the automated-driving hybrid vehicle travels to a $CO_2$ recovery road. Specifically, when the residual charging capacity of the battery in a hybrid vehicle (an automated-driving vehicle) traveling in a $CO_2$ recovery area is equal to or less than the SOC threshold value or when the residual charging capacity of the battery is predicted to be equal to or less than the SOC threshold value, control is performed such that the automated-driving hybrid vehicle travels on the $CO_2$ recovery road. For example, a travel plan for automated driving is set. Alternatively, the travel plan for automated driving is changed. Accordingly, it is possible to set or change the travel plan for automated driving of an automated-driving hybrid vehicle in which the residual charging capacity of the battery has decreased and the engine needs to be operated such that the automated-driving hybrid vehicle travels on a $CO_2$ recovery road beforehand. Accordingly, it is possible to operate the engine when the automated-driving hybrid vehicle is traveling on a $CO_2$ recovery road and to efficiently recover carbon dioxide discharged from the engine at that time on the $CO_2$ recovery road.

When the hybrid vehicle (including an automated-driving hybrid vehicle) having traveled to the $CO_2$ recovery road reaches the $CO_2$ recovery road, the carbon dioxide recovery system according to the disclosure starts the engine and starts charging of the battery (that is, performs SOC restoration control which will be described later). At this time, carbon dioxide discharged by operating the engine is collected and recovered by a stationary $CO_2$ recovery device provided in the $CO_2$ recovery road. Accordingly, with the carbon dioxide recovery system according to the disclosure, it is possible to effectively reduce an amount of carbon dioxide discharged from the hybrid vehicle to the atmosphere.

When a hybrid vehicle (including an automated-driving hybrid vehicle) travels in a $CO_2$ recovery area and the hybrid vehicle travels to a $CO_2$ recovery road after the residual charging capacity of the battery has become equal to or less than the SOC threshold value or after the residual charging capacity of the battery has been predicted to be equal to or less than the SOC threshold value, the carbon dioxide recovery system according to the disclosure decreases the engine-start threshold value temporarily (that is, until the hybrid vehicle reaches the $CO_2$ recovery road). The engine-start threshold value is a threshold value which his set to prevent over-discharging of the battery and to protect the battery. By temporarily decreasing the engine-start threshold value, a timing at which the engine is started is delayed when the residual charging capacity of the battery has decreased. Accordingly, when the residual charging capacity of the battery in the hybrid vehicle traveling in the $CO_2$ recovery area decreases and the hybrid vehicle travels to a $CO_2$ recovery road, it is possible to delay the timing at which the engine is started and to curb starting of the engine before the hybrid vehicle reaches the $CO_2$ recovery road. Accordingly, it is possible to enhance a frequency or a proportion at which the engine is operated when the hybrid vehicle travels on a $CO_2$ recovery road. As a result, with the carbon dioxide recovery system according to the disclosure, it is possible to more effectively reduce an amount of carbon dioxide discharged from the hybrid vehicle to the atmosphere.

The carbon dioxide recovery system according to the disclosure includes the HMI device that is used to exchange information and signals between the vehicle and a driver of the vehicle. The HMI device includes a notification unit configured to notify the driver of the vehicle of predetermined information such as a display (or a monitor), a touch panel, or a speaker. For example, the HMI device displays a still image or a moving image on the monitor to allow the driver to recognize predetermined information. Alternatively, the HMI device reproduces voice guidance from the speaker to allow the driver to recognize predetermined information. The HMI device acquires the residual charging capacity of the battery of the vehicle and position information of the vehicle and notifies the driver of the vehicle of information or an instruction for prompting the vehicle to travel on a $CO_2$ recovery road when the residual charging capacity of the battery is equal to or less than the predetermined SOC threshold value or when the residual charging capacity of the battery is predicted to be equal to or less than the SOC threshold value while the vehicle is traveling in a $CO_2$ recovery area. Accordingly, by mounting the HMI device of the carbon dioxide recovery system according to the disclosure in a hybrid vehicle, it is possible to guide the hybrid vehicle in which the residual charging capacity of the battery has decreased and the engine needs to be operated such that the hybrid vehicle travels on a $CO_2$ recovery road beforehand (before the engine is actually operated). Accordingly, it is possible to operate the engine when the hybrid vehicle travels on the $CO_2$ recovery road and to efficiently recover carbon dioxide discharged at that time on the $CO_2$ recovery road.

6

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a flowchart illustrating an example of a control routine which is performed by the carbon dioxide recovery system according to the disclosure and particularly illustrating control details of transmitting position information of a hybrid vehicle and SOC information of a battery to a server or the like;

FIG. 7 is a flowchart illustrating an example of a control routine which is performed by the carbon dioxide recovery system according to the disclosure and particularly illustrating control details of setting a travel route passing through a $CO_2$ recovery road based on acquired position information of a hybrid vehicle, acquired SOC information of a battery, and the like;

FIG. 10 is a diagram illustrating an example in which carbon dioxide discharged from a hybrid vehicle is recovered by operating the carbon dioxide recovery system according to the disclosure and illustrating control for temporarily decreasing an engine-start threshold value when a hybrid vehicle traveling in a $CO_2$ recovery area travels to a $CO_2$ recovery road in which a stationary $CO_2$ recovery device is installed;

DETAILED DESCRIPTION OF EMBODIMENTS

An embodiment of the disclosure will be described below with reference to the accompanying drawings. The following embodiment is only an example in which the disclosure is embodied and is not intended to limit the disclosure.

Figure 1:
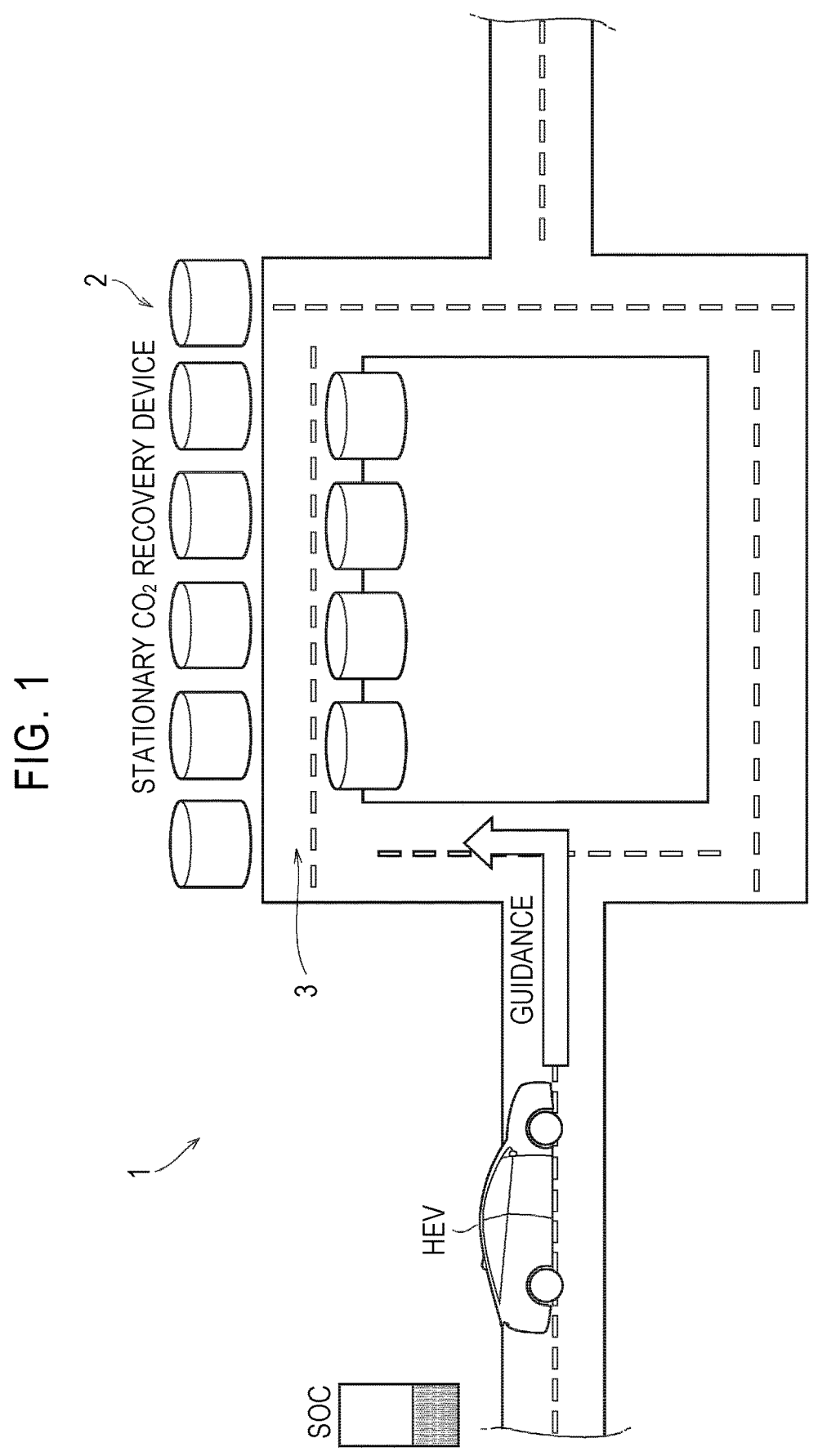
FIG. 1 is a diagram illustrating an example in which carbon dioxide is recovered from a hybrid vehicle by operating a carbon dioxide recovery system according to the disclosure and illustrating control for guiding a hybrid vehicle traveling in a $CO_2$ recovery area to a $CO_2$ recovery road in which a stationary $CO_2$ recovery device is installed.
Figure 2:
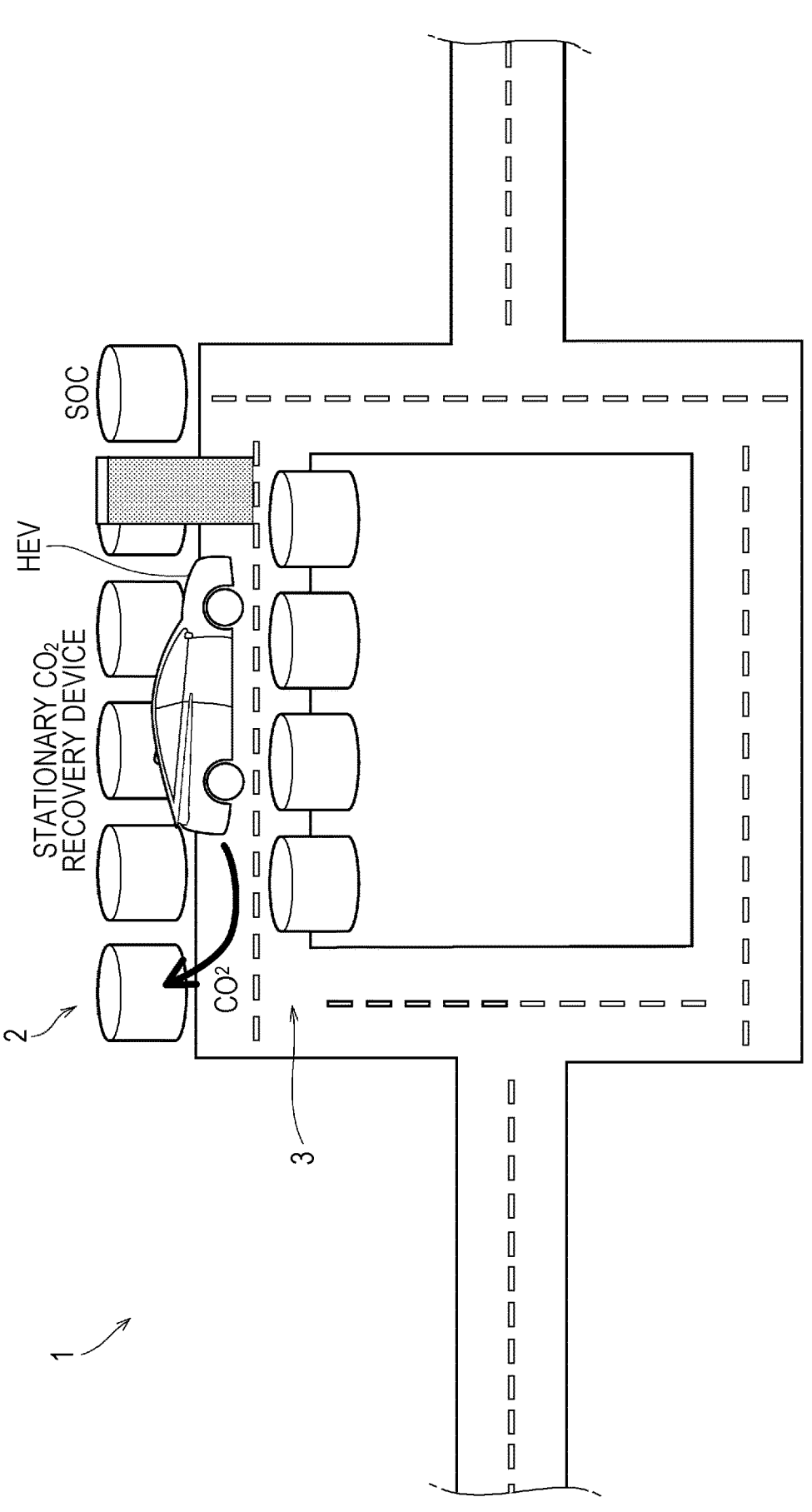
FIG. 2 is a diagram illustrating an example in which carbon dioxide is recovered from a hybrid vehicle by operating the carbon dioxide recovery system according to the disclosure and illustrating control for charging a battery (SOC restoration control) by operating an engine of the hybrid vehicle on a $CO_2$ recovery road in which a stationary $CO_2$ recovery device is installed.

A carbon dioxide recovery system according to the embodiment of the disclosure collects and recovers carbon dioxide discharged from a hybrid vehicle HEV which travels in a $CO_2$ recovery area 1 as illustrated in FIG. 1. A $CO_2$ recovery road 3 including a stationary $CO_2$ recovery device 2 is provided in the $CO_2$ recovery area 1, and carbon dioxide discharged from an engine 11 of a hybrid vehicle HEV which will be described later when the hybrid vehicle HEV travels on the $CO_2$ recovery road 3 is recovered by the stationary $CO_2$ recovery device 2 as illustrated in FIG. 2.

The $CO_2$ recovery area 1 is a section, an area, or a range in which a $CO_2$ recovery road 3 is provided and is set according to construction places and the number of $CO_2$ recovery roads 3. For example, an area of a range (a service area) within a predetermined distance from a place in which a $CO_2$ recovery road 3 is constructed is set in advance as the $CO_2$ recovery area 1.

The stationary $CO_2$ recovery device 2 collects and recovers carbon dioxide from the atmosphere, particularly, exhaust gas discharged to the atmosphere. The stationary $CO_2$ recovery device 2 according to the embodiment of the disclosure mainly recovers or collects carbon dioxide in exhaust gas of a vehicle in which an engine is mounted. Accordingly, the stationary $CO_2$ recovery device 2 is fixed to, for example, a place in which exhaust gas of a vehicle is likely to stay such as a road tunnel, an underpass, or a place in the vicinity of a start point of an uphill road. By providing the stationary $CO_2$ recovery device 2 in such a place, it is possible to efficiently recover carbon dioxide in exhaust gas discharged from a vehicle.

Recovery of carbon dioxide in the stationary $CO_2$ recovery device 2 can be performed, for example, using various known methods and techniques such as a "physical adsorption method," a "physical absorption method," a "chemical absorption method," and a "low-temperature separation method" which are described in JP 2021-8852 A. In the "physical adsorption method," for example, carbon dioxide is adsorbed on a solid adsorbent such as activated carbon or zeolite by bringing the solid adsorbent into contact with exhaust gas, and carbon dioxide is separated and recovered from the solid adsorbent by heating or depressurizing the solid adsorbent having adsorbed carbon dioxide thereon. In the "physical absorption method," for example, carbon dioxide is physically absorbed in an absorbent that can dissolve carbon dioxide such as methanol or ethanol under an high-pressure and low-temperature environment by bringing the absorbent into contact with exhaust gas, and carbon dioxide is recovered from the absorbent by heating or depressurizing the absorbent having absorbed carbon dioxide therein. In the "chemical absorption method," for example, an absorbent such as amine that can selectively dissolve carbon dioxide is brought into contact with exhaust gas, carbon dioxide is absorbed in the absorbent through a chemical reaction occurring at this time, and carbon dioxide is dissociated and recovered from the absorbent by heating the absorbent having absorbed carbon dioxide therein. In the "low-temperature separation method," carbon dioxide is liquefied by pressurizing and cooling exhaust gas, and carbon dioxide is recovered by selectively distilling liquefied $CO_2$.

The $CO_2$ recovery road 3 is a road in which a stationary $CO_2$ recovery device 2 is installed and is, for example, a road in a tunnel in which a stationary $CO_2$ recovery device 2 is installed or a road forming an underpass in which a stationary $CO_2$ recovery device 2 is installed. As described above, the $CO_2$ recovery road 3 is constructed in a $CO_2$ recovery area 1. In other words, a $CO_2$ recovery area 1 is set in a range of a predetermined distance from the $CO_2$ recovery road 3 in which a stationary $CO_2$ recovery device 2 is installed. One $CO_2$ recovery road 3 may be constructed for each $CO_2$ recovery area 1. Alternatively, a plurality of $CO_2$ recovery roads 3 may be constructed in one $CO_2$ recovery area 1.

The hybrid vehicle HEV that is controlled in the embodiment of the disclosure includes a plurality of power sources including an engine (an internal combustion engine) and a motor and a battery that transmits and receives electric power to and from the motor which is one power source. The engine of the hybrid vehicle HEV is an internal combustion engine that generates at least power for traveling or power generation and discharges exhaust gas including carbon dioxide when the engine operates by combusting fuel. An example of a configuration (a drive system and a control system) of the hybrid vehicle HEV that is controlled in the embodiment of the disclosure is illustrated in FIG. 3.

Figure 3:
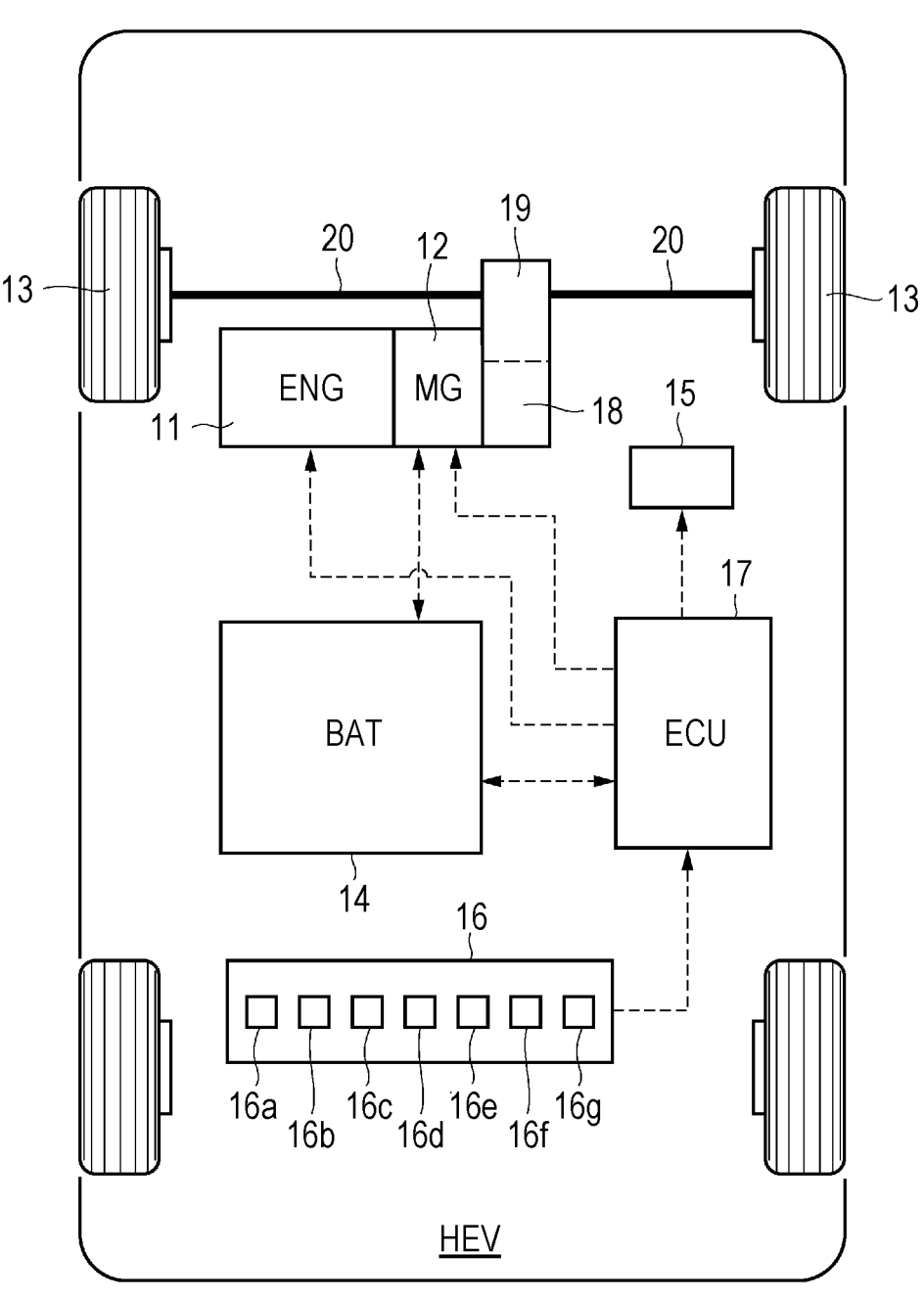
FIG. 3 is a diagram schematically illustrating a configuration of a hybrid vehicle which is controlled in the carbon dioxide recovery system according to the disclosure.

The hybrid vehicle HEV illustrated in FIG. 3 includes an engine (ENG) 11 and a motor (MG) 12 as power sources. The hybrid vehicle HEV further includes driving wheels 13, a battery (BAT) 14, a notification device 15, a detection unit 16, and an onboard controller (ECU) 17 as principal constituents. The hybrid vehicle HEV in the embodiment of the disclosure may include one or more motors in addition to the motor 12 as power sources. The hybrid vehicle HEV may be a so-called hybrid drive unit) including a power split mechanism (not illustrated) and a gear shift mechanism (not illustrated) in addition to the engine 11 and the motor 12. The hybrid vehicle HEV in the embodiment of the disclosure may be a so-called range extender (or a series type hybrid vehicle) that includes a power generator (not illustrated) separately from the motor 12 which is a power source and a dedicated engine (not illustrated) driving the power generator instead of the engine 11.

The engine 11 is, for example, an internal combustion engine using liquid fuel such as a gasoline engine or a diesel engine. The engine 11 is configured such that adjustment of an output power and operations such as starting and stopping are electrically controlled by the onboard controller 17 which will be described later. When the engine 11 is a gasoline engine, a throttle valve opening level, an amount of supplied or injected fuel, execution and stopping of ignition, an ignition timing, and the like are electrically controlled. When the engine 11 is a diesel engine, an amount of injected fuel, a fuel injection timing, and the like are electrically controlled. In the embodiment illustrated in FIG. 3, the engine 11 is a power source of the hybrid vehicle HEV and generates traveling power of the hybrid vehicle HEV along with the motor 12.

The motor 12 is constituted by, for example, a permanent magnet synchronous motor or an induction motor. The motor 12 has at least a function of a motor that is operated with supply of electric power thereto to output a torque. The motor 12 also has a function of a power generator that is operated with an externally received torque to generate electric power. That is, the motor 12 is a so-called motor generator having the function of a motor and the function of a power generator. A battery 14 which will be described later is connected to the motor 12 via an inverter (not illustrated). Accordingly, electric power stored in the battery 14 can be supplied to the motor 12, and the motor 12 can be operated as a motor to output a drive torque. The motor 12 can also be operated as a power generator with a torque transmitted from the driving wheels 13 and store regenerative electric power generated at that time in the battery 14. An output rotation speed or an output torque of the motor 12 is electrically connected by the onboard controller 17 which will be described later. Switching between the function of a motor and the function of a power generator or the like is electrically connected.

The driving wheels 13 generates a driving force for the hybrid vehicle HEV with a drive torque transmitted from a power source. In the embodiment illustrated in FIG. 3, the driving wheels 13 are connected to a power source, that is, the engine 11 and the motor 12, via a gear shift mechanism 18, a differential gear 19, a drive shaft 20, and the like. The hybrid vehicle HEV in the embodiment of the disclosure may be a front-wheel-drive vehicle in which a drive torque is transmitted to front wheels and a driving force is generated with the front wheels as in the embodiment illustrated in FIG. 3. Alternatively, the hybrid vehicle HEV may be a rear-wheel-drive vehicle in which a drive torque is transmitted to rear wheels, for example, via a propeller shaft (not illustrated) and a driving force is generated with the rear wheels. Alternatively, the hybrid vehicle HEV may be a four-wheel-drive vehicle in which a transfer mechanism (not illustrated) is provided to transmit a drive torque to both the front wheels and the rear wheels and a driving force is generated with both the front wheels and the rear wheels.

The battery 14 is a secondary battery that supplies electric power to the motor 12 and stores electric power generated by the motor 12 and is electrically connected to the motor 12 via an inverter (not illustrated) such that electric power is transmitted and received to and from the motor 12. Accordingly, the motor 12 can be operated as a power generator with an output torque of the engine 11 and the battery 14 can be charged with electric power generated by the motor 12 at that time.

The notification device 15 is an instrument or a device that notifies a driver of the hybrid vehicle HEV of information which is output from a control unit 100 according to the embodiment of the disclosure which will be described later. For example, the notification device 15 displays image/video information transmitted from the control unit 100 on a liquid crystal display, a touch panel, a head-up display, or a display lamp (none of which is displayed), or the like to allow the driver of the hybrid vehicle HEV to recognize the image/video information. Alternatively the notification device 15 reproduces voice information, voice guidance, or the like transmitted from the control unit 100 using a speaker (not illustrated) to allow the driver of the hybrid vehicle HEV to recognize the voice information, the voice guidance, or the like.

The detection unit 16 is an instrument or a device that acquires various data or information required to control the hybrid vehicle HEV and includes, for example, a power supply unit, a microcomputer, a sensor, and an input/output interface (none of which is illustrated). Particularly, the detection unit 16 in the embodiment of the disclosure detects data for controlling the operation of the engine 11 such as a residual charging capacity or a state of charge of the battery 14, position information of the hybrid vehicle HEV, and the like. Specifically, the detection unit 16 includes various sensors or instruments such as a vehicle speed sensor (or a wheel speed sensor) 16a that detects a vehicle speed, an engine rotation speed sensor 16b that detects a rotation speed of the engine 11, a motor rotation speed sensor (or a resolver) 16c that detects a rotation speed of the motor 12, an SOC sensor 16d that detects a residual charging capacity (a numerical value indicating a state of charge) of the battery 14, a timer 16e that detects a timing at which data or information is transmitted or received and an elapsed time therefrom, a global positioning system (GPS) receiver 16f that acquires position information of the hybrid vehicle HEV, and an onboard camera 16g that acquires image information on external situations of the hybrid vehicle HEV. The detection unit 16 is electrically connected to the onboard controller 17 which will be described later and outputs an electrical signal corresponding to a detected value or a calculated value from the various sensors, instrument, or devices as detection data to the onboard controller 17.

The onboard controller 17 constitutes the control unit 100 in the embodiment of the disclosure which will be described later. In the embodiment illustrated in FIG. 4 which will be described later, the onboard controller 17 constitutes the control unit 100 along with a server 21 that is provided outside of the hybrid vehicle HEV.

The onboard controller 17 is, for example, an electronic control unit including a microcomputer as a main constituent. Particularly, the onboard controller 17 in the embodiment of the disclosure controls the operation of the engine 11. Specifically, the onboard controller 17 starts the engine 11 based on the residual charging capacity of the battery 14, the position information of the hybrid vehicle HEV, and the like. Various types of data detected or calculated by the detection unit 16 are input to the onboard controller 17. The onboard controller 17 performs an arithmetic operation using the input various types of data and data, calculation expressions, or the like which is stored in advance. The onboard controller 17 outputs results of the arithmetic operation as control command signals and is configured to control the operation of the engine 11. An example in which one onboard controller 17 is provided is illustrated in FIG. 3, and a plurality of onboard controller 17 may be provided for each device or instrument to be controlled or for each of control details.

Figure 4:
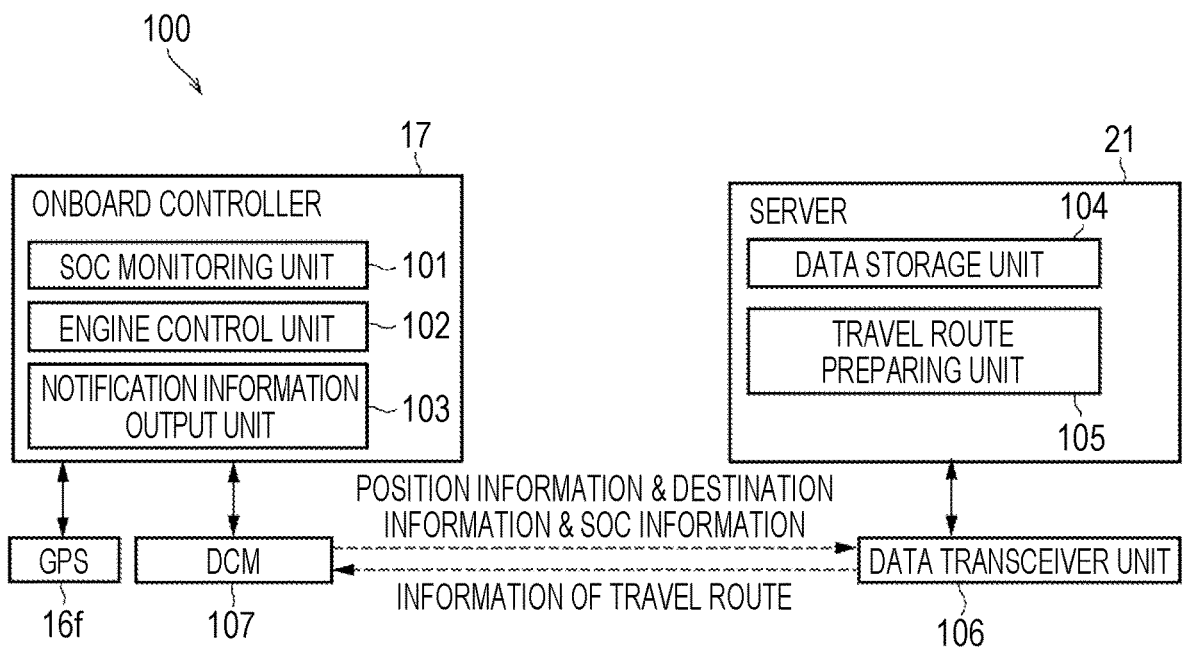
FIG. 4 is a block diagram illustrating a configuration of the carbon dioxide recovery system according to the disclosure and illustrating a control unit including an onboard controller mounted in a hybrid vehicle and a server outside of the hybrid vehicle, and a control system, a communication system, and the like associated with the control unit.

The carbon dioxide recovery system according to the embodiment of the disclosure includes the control unit 100 that comprehensively controls the hybrid vehicle HEV, for example, as illustrated in FIG. 4. The control unit 100 guides the hybrid vehicle HEV to a $CO_2$ recovery road 3 when the engine 11 of the hybrid vehicle HEV traveling in a $CO_2$ recovery area 1 operates or when the engine 11 of the hybrid vehicle HEV traveling in the $CO_2$ recovery area 1 is predicted to operate. The control unit 100 notifies a driver of the hybrid vehicle HEV of information or instructions for prompting the hybrid vehicle REV to travel on the $CO_2$ recovery road 3.

In the embodiment illustrated in FIG. 4, the control unit 100 includes the onboard controller 17 and a server 21 that is provided outside of the hybrid vehicle HEV. The control unit 100 transmits and receives data to and from the onboard controller 17 and the server 21 and controls the hybrid vehicle HEV in cooperation. For example, in the control unit 100, predetermined data detected or calculated by the detection unit 16 is transmitted from the onboard controller 17 to the server 21. The onboard controller 17 receives results of arithmetic operations from the server 21. The onboard controller 17 controls the hybrid vehicle HEV based on the results of arithmetic operations.

Specifically, the control unit 100 includes an SOC monitoring unit 101, an engine control unit 102, a notification information output unit 103, a data storage unit 104, a travel route preparing unit 105, and a data transceiver unit 106 as major components. In the embodiment illustrated in FIG. 4, the SOC monitoring unit 101, the engine control unit 102, and the notification information output unit 103 are provided in the onboard controller 17 of the hybrid vehicle HEV. On the other hand, the data storage unit 104, the travel route preparing unit 105, and the data transceiver unit 106 are provided in the outside server 21.

The SOC monitoring unit 101 monitors the residual charging capacity of the battery 14. Specifically, the SOC monitoring unit 101 acquires a numerical value (SOC) indicating the residual charging capacity or the state of charge of the battery 14 detected by the SOC sensor 16d and compares the acquired numerical value with a predetermined threshold value such as an SOC threshold value $T_0$ or engine-start threshold values $T_1$ and $T_2$ which will be described later.

The engine control unit 102 controls the operation of the engine 11. Particularly, the engine control unit 102 in the embodiment of the disclosure starts the engine 11 based on the residual charging capacity of the battery 14 and the position information of the hybrid vehicle HEV. For example, when the hybrid vehicle HEV reaches a $CO_2$ recovery road 3 after the residual charging capacity of the battery 14 has become equal to or less than the SOC threshold value $T_0$ as will be described later, the engine control unit 102 starts the engine 11.

The notification information output unit 103 generates and outputs an information signal which is caused a driver of the hybrid vehicle HEV to recognize via the notification device 15 based on information on a travel route which is prepared by the travel route preparing unit 105 of the server 21 which will be described later. For example, the notification information output unit 103 outputs an information signal to be displayed on a display of the notification device 15. Alternatively, the notification information output unit 103 outputs an information signal to be reproduced by a speaker of the notification device 15.

The data storage unit 104 stores various types of data or information received from the onboard controller 17, various types of data or information processed by the server 21, predetermined map information, and the like in a storage medium (not illustrated) as a database. For example, an installation place of a stationary $CO_2$ recovery device 2 and map information near a $CO_2$ recovery road 3 in which the stationary $CO_2$ recovery device 2 is installed, that is, map information on a $CO_2$ recovery area 1, are stored in the data storage unit 104.

The travel route preparing unit 105 prepares information on a travel route of the hybrid vehicle HEV based on various types of data or information received from the onboard controller 17, the map information stored in the data storage unit 104, and the like. Specifically, the travel route preparing unit 105 prepares information on a travel route of the hybrid vehicle HEV based on data on the residual charging capacity or the state of charge (SOC information) of the battery 14 received from the onboard controller 17, the position information (a current position) of the hybrid vehicle HEV, and the like. When the residual charging capacity of the battery 14 is small and the battery 14 needs to be charged by operating the engine 11, the travel route preparing unit 105 prepares a travel route of the hybrid vehicle HEV such that the hybrid vehicle HEV is guided to a nearest $CO_2$ recovery road 3.

The data transceiver unit 106 transmits and receives information and data between the onboard controller 17 and the server 21 via a communication module 107 which will be described later. For example, the data transceiver unit 106 receives the position information of the hybrid vehicle HEV, the SOC information of the battery 14, and destination information of the hybrid vehicle HEV (when a destination is set by a navigation system or the like), and the like which are transmitted from the communication module 107 of the onboard controller 17 side to the server 21. The data transceiver unit 106 transmits the information on the travel route of the hybrid vehicle HEV prepared by the travel route preparing unit 105 from the server 21 to the communication module 107 of the onboard controller 17 side.

In the embodiment illustrated in FIG. 4, the communication module (DCM) 107 that transmits and receives information and data between the onboard controller 17 of the hybrid vehicle HEV and the outside server 21 is provided in the hybrid vehicle HEV.

The communication module 107 performs radio communication between the onboard controller 17 and the server 21. The communication module 107 is mounted as a dedicated communication system (not illustrated) called a data communication module (DCM) in the hybrid vehicle HEV and transmits and receives various types of data using a dedicated communication line between the onboard controller 17 and the data transceiver unit 106 of the server 21. The communication module 107 may transmit and receive data using a general-purpose communication device (not illustrated) via a general mobile communication line. Particularly, in the embodiment of the disclosure, the communication module 107 transmits the position information of the hybrid vehicle HEV, the SOC information of the battery 14, the destination information of the hybrid vehicle BEV (when a destination is set by a navigation system or the like), and the like which are acquired by the onboard controller 17 to the server 21. The communication module 107 transmits the information on the travel route of the hybrid vehicle HEV prepared by the travel route preparing unit 105 of the server 21 to the onboard controller 17.

The carbon dioxide recovery system according to the embodiment of the disclosure may constitute a control unit that acquires the residual charging capacity of the battery and the position information of the hybrid vehicle HEV without using the outside server and controls the operation of the engine 11. For example, a control unit 200 illustrated in FIG. 5 includes a first ECU 201 and a second ECU 202 which are mounted in a hybrid vehicle HEV as the onboard controller 17. The first ECU 201 and the second ECU 202 are connected to transmit and receive information and data.

Figure 5:
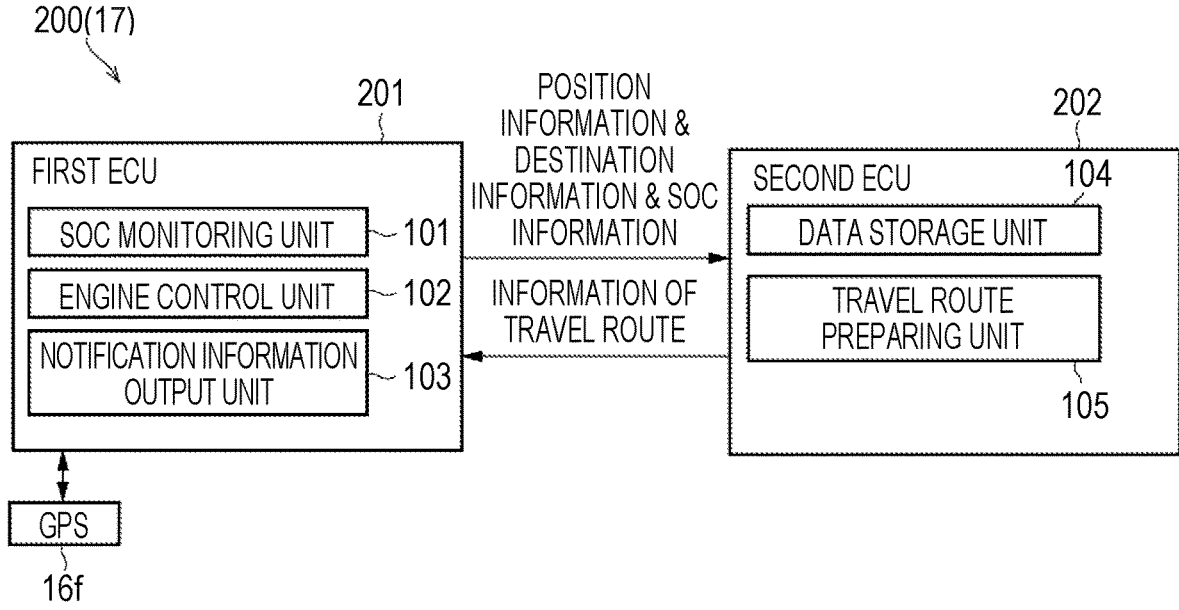
FIG. 5 is a block diagram illustrating a configuration of the carbon dioxide recovery system according to the disclosure and illustrating a control unit including an onboard controller (a first ECU and a second ECU) mounted in a hybrid vehicle and a control system, a communication system, and the like associated with the control unit.

In the control unit 200 illustrated in FIG. 5, the same elements in function or control details as in the control unit 100 illustrated in FIG. 4 will be referred to by the same reference signs as illustrated in FIG. 4. Accordingly, in the embodiment illustrated in FIG. 5, the first ECU 201 of the control unit 200 functions in the same way as the onboard controller 17 of the control unit 100 illustrated in FIG. 4, and the second ECU 202 of the control unit 200 functions in the same way as the server 21 of the control unit 100 illustrated in FIG. 4.

An example of the control unit 200 including two onboard controllers 17 such as the first ECU 201 and the second ECU 202 is illustrated in FIG. 5, and, for example, the first ECU 201 and the second ECU 202 may be unified as the control unit in the embodiment of the disclosure. Alternatively, for example, the control unit may include three or more onboard controllers 17 for each of control details or objects.

As described above, the carbon dioxide recovery system according to the embodiment of the disclosure is designed mainly for effectively reducing carbon dioxide discharged from a hybrid vehicle HEV to the atmosphere. For this purpose, the carbon dioxide recovery system according to the embodiment of the disclosure is configured to perform control routines illustrated in the flowcharts of FIGS. 6, 7, 8, 9, 11, and 12.

Figure 6:
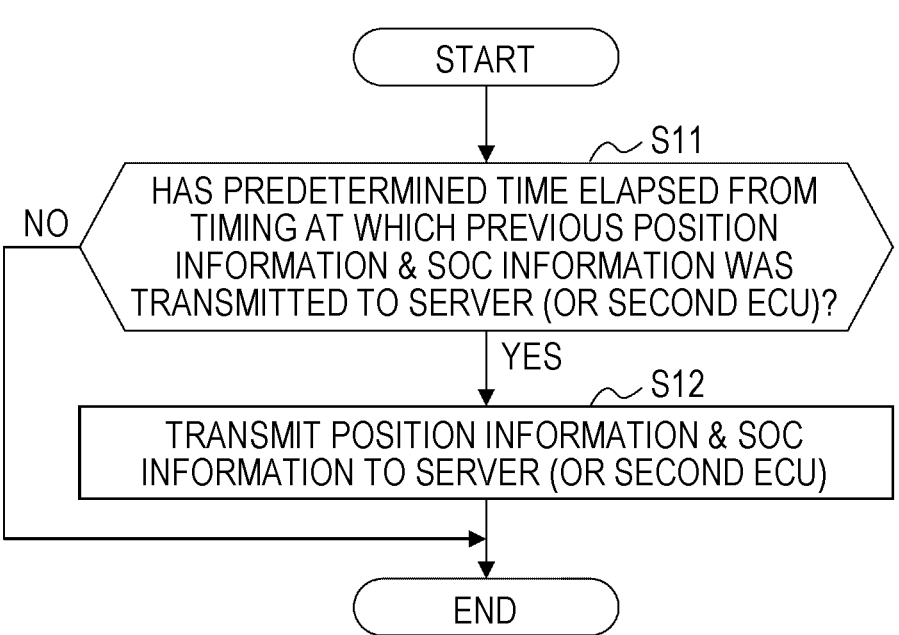

The control routine illustrated in the flowchart of FIG. 6 is performed by the onboard controller 17 of the control unit 100 in the embodiment illustrated in FIG. 4. The control routine is performed by the control unit 200, that is, the first ECU 201 of the onboard controller 17, in the embodiment illustrated in FIG. 5. The control routine illustrated in the flowchart of FIG. 6 is performed by a control unit 300, that is, a first ECU 301 of the onboard controller 17, in an embodiment illustrated in FIG. 13 which will be described later. The control routine is performed by a first ECU 401 of an HMI device 400 in an embodiment illustrated in FIG. 15 which will be described later.

In the flowchart illustrated in FIG. 6, in Step S11, it is determined whether a predetermined time has elapsed from a timing at which the position information of the hybrid vehicle HEV and the SOC information of the battery 14, that is, a numerical value (SOC) indicating the residual charging capacity or the state of charge of the battery 14, was previously transmitted from the onboard controller 17 to the server 21 or from the first ECU 201 to the second ECU 202.

When the predetermined time has not elapsed yet from the timing at which the position information of the hybrid vehicle HEV and the SOC information of the battery 14 were previously transmitted and thus the determination result of Step S11 is negative, the control routine illustrated in the flowchart of FIG. 6 temporarily ends without performing subsequent control.

On the other hand, when the predetermined time has elapsed from the timing at which the position information of the hybrid vehicle HEV and the SOC information of the battery 14 were previously transmitted and thus the determination result of Step S11 is positive, the control routine proceeds to Step S12. At the start of the control routine (in the first control routine), since information and data are first transmitted in Step S12, the determination result of Step S11 is positive and the control routine proceeds to Step S12.

In Step S12, the position information of the hybrid vehicle HEV and the SOC information of the battery 14 are transmitted from the onboard controller 17 to the server 21. Alternatively, such information is transmitted from the first ECU 201 to the second ECU 202.

When the position information of the hybrid vehicle HEV and the SOC information of the battery 14 are transmitted in Step S12, the control routine illustrated in the flowchart of FIG. 6 temporarily ends.

Figure 7:
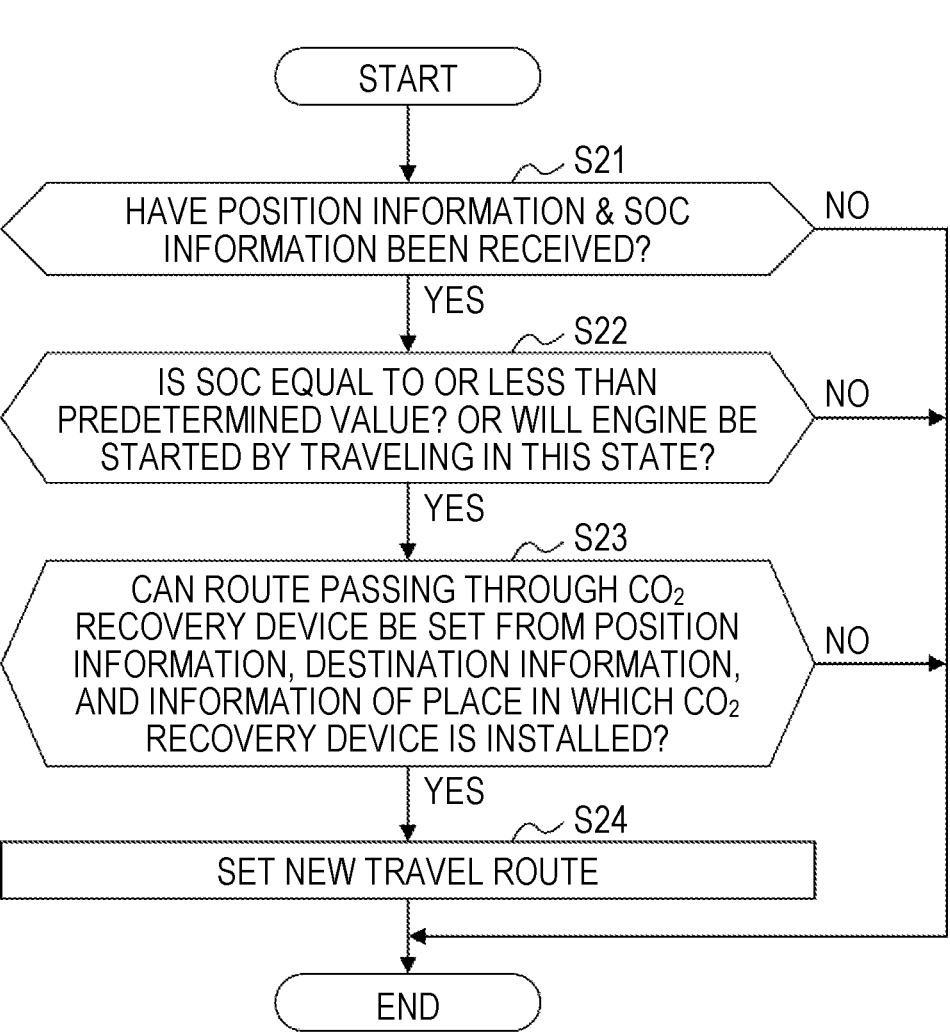

In the control routine illustrated in the flowchart of FIG. 6, when the position information of the hybrid vehicle HEV and the SOC information of the battery 14 are transmitted, the control routine illustrated in the flowchart of FIG. 7 is performed by the party receiving the information and data. That is, the control routine illustrated in the flowchart of FIG. 7 is performed by the server 21 of the control unit 100 in the embodiment illustrated in FIG. 4. The control routine is performed by the control unit 200, that is, the second ECU 202 of the onboard controller 17, in the embodiment illustrated in FIG. 5. The control routine illustrated in the flowchart of FIG. 7 is performed by the control unit 300, that is, a second ECU 302 of the onboard controller 17, in the embodiment illustrated in FIG. 13 which will be described later. The control routine is performed by a second ECU 402 of the HMI device 400 in the embodiment illustrated in FIG. 15 which will be described later.

In the flowchart illustrated in FIG. 7, in Step S21, the server 21 of the control unit 100 or the second ECU 202 of the control unit 200 determines whether the position information of the hybrid vehicle HEV and the SOC information of the battery 14 have been received.

When the position information of the hybrid vehicle HEV and the SOC information of the battery 14 have not been received yet and thus the determination result of Step S21 is negative, the control routine illustrated in the flowchart of FIG. 7 ends temporarily without performing subsequent control.

On the other hand, when the position information of the hybrid vehicle HEV and the SOC information of the battery 14 have been received and thus the determination result of Step S21 is positive, the control routine proceeds to Step S22.

In Step S22, whether the SOC (or the residual charging capacity) of the battery 14 is equal to or less than a predetermined SOC threshold value $T_0$ or whether the SOC of the battery 14 is predicted to be equal to or less than the predetermined SOC threshold value $T_0$ is determined from the acquired SOC information. The SOC threshold value $T_0$ is a threshold value for determining that the SOC of the battery 14 is less than an engine-start threshold value $T_1$ which will be described later and the engine 11 is started or the engine 11 is predicted to be started in the near future, for example, after a predetermined time ranging from several tens of minutes to several hours has elapsed or after the hybrid vehicle HEV has traveled several km to several tens of km. The SOC threshold value is set in advance based on characteristics, performance, or the like of the hybrid vehicle HEV and based on results of traveling test, simulation, or the like using an actual vehicle. "Prediction" in this case is, for example, "to predict that the SOC of the battery 14 becomes equal to or less than the SOC threshold value $T_0$ after a predetermined time has elapsed" or "to predict that the SOC of the battery 14 becomes equal to or less than the SOC threshold value $T_0$ after the hybrid vehicle HEV has traveled a predetermined distance." In other words, in Step S22, it is determined whether the engine 11 is to be started due to a decrease of the residual charging capacity of the battery 14 when the hybrid vehicle HEV continues to travel in this state.

When the determination result of Step S22 is negative because the SOC of the battery 14 is greater than the SOC threshold value $T_0$ and the engine 11 is not to be started for the time being due to a decrease of the residual charging capacity of the battery 14 or the engine 11 is predicted not to be started due to the decrease of the residual charging capacity of the battery 14 even if the hybrid vehicle HEV continues to travel in this state, the control routine illustrated in FIG. 7 ends temporarily without performing subsequent control.

On the other hand, when the determination result of Step S22 is positive because the SOC of the battery 14 is equal to or less than the SOC threshold value $T_0$ and the engine 11 is started due to the decrease of the residual charging capacity of the battery 14 or the engine 11 is predicted to be started due to the decrease of the residual charging capacity of the battery 14 even if the hybrid vehicle HEV continues to travel in this state, the control routine proceeds to Step S23.

In Step S23, whether a travel route in which the hybrid vehicle HEV passes through a $CO_2$ recovery road 3 is to be set is determined based on the acquired position information (current position) of the hybrid vehicle HEV, information on an installation place of a stationary $CO_2$ recovery device 2 (such as map information near the $CO_2$ recovery road 3 in which the stationary $CO_2$ recovery device 2 is installed or map information of a $CO_2$ recovery area 1), and destination information of the hybrid vehicle REV (when a destination is set by a navigation system or the like).

For example, when the determination result of Step S23 is negative because a $CO_2$ recovery road 3 is not present in the vicinity of a traveling point predicted after a predetermined time has elapsed or after the hybrid vehicle HEV has traveled a predetermined distance or a distance from a $CO_2$ recovery road 3 closest to the set destination is greater than a predetermined distance and thus a travel route in which the hybrid vehicle HEV passes through a $CO_2$ recovery road 3 cannot be set, the control routine illustrated in FIG. 7 ends temporarily without performing subsequent control.

On the other hand, when the determination result of Step S23 is positive because a travel route in which the hybrid vehicle HEV passes through a $CO_2$ recovery road 3 can be set, the control routine proceeds to Step S24.

In Step S24, a travel route in which the hybrid vehicle HEV passes through a $CO_2$ recovery road 3 is set to notify a driver of the hybrid vehicle HEV. When a destination is set by a navigation system or the like, an existing travel route which is currently set for the destination is changed to a new travel route in which the hybrid vehicle HEV passes through a $CO_2$ recovery road 3. When a $CO_2$ recovery road 3 is included in the existing travel route, the existing travel route is updated as a new travel route in which the hybrid vehicle HEV passes through a $CO_2$ recovery road 3 without any change. When a destination is not set by the navigation system or the like, a travel route in which the hybrid vehicle HEV passes through a $CO_2$ recovery road 3 is newly set to guide the hybrid vehicle HEV to a $CO_2$ recovery road 3 or to prompt a driver of the hybrid vehicle HEV to travel on a $CO_2$ recovery road 3. At the same time, information and data on the set travel route passing through a $CO_2$ recovery road 3 are transmitted from the server 21 to the onboard controller 17. Alternatively, such information and data are transmitted from the second ECU 202 to the first ECU 201.

When a travel route in which the hybrid vehicle HEV passes through a $CO_2$ recovery road 3 is set and information and data on the travel route are transmitted in Step S24, the control routine illustrated in FIG. 7 ends temporarily.

Figure 8:
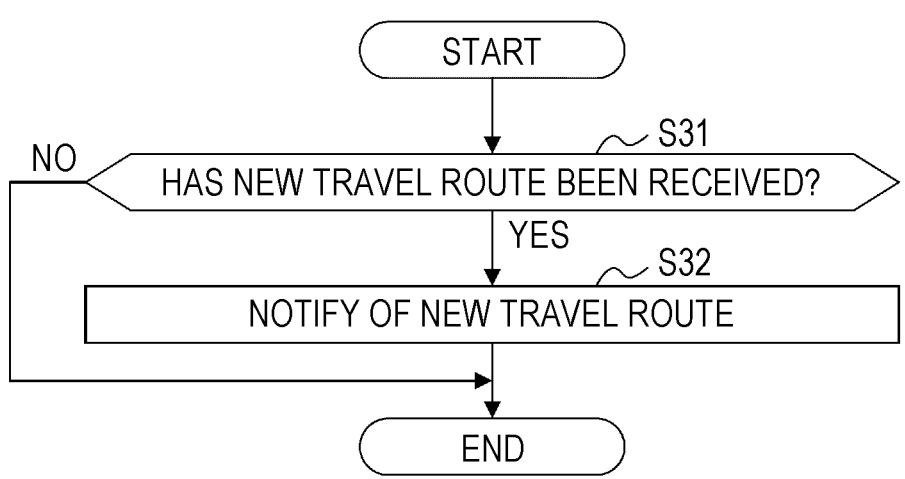
FIG. 8 is a flowchart illustrating an example of a control routine which is performed by the carbon dioxide recovery system according to the disclosure and particularly illustrating control details of notifying (informing) a driver of a hybrid vehicle of a set travel route passing through a $CO_2$ recovery road.

In the control routine illustrated in the flowchart of FIG. 7, when information and data on a travel route in which the hybrid vehicle HEV passes through a $CO_2$ recovery road 3 are transmitted, a party receiving the information and data performs the control routine illustrated in the flowchart of FIG. 8. That is, the control routine illustrated in the flowchart of FIG. 8 is performed by the onboard controller 17 of the control unit 100 in the embodiment illustrated in FIG. 4. The control routine is performed by the control unit 200, that is, the first ECU 201 of the onboard controller 17, in the embodiment illustrated in FIG. 5. The control routine illustrated in the flowchart of FIG. 8 is performed by the first ECU 401 of the HMI device 400 in the embodiment illustrated in FIG. 15 which will be described later.

In the flowchart illustrated in FIG. 8, in Step S31, the onboard controller 17 of the control unit 100 or the first ECU 201 of the control unit 200 determines whether information and data on a travel route in which the hybrid vehicle HEV passes through a $CO_2$ recovery road 3 have been received.

When the determination result of Step S31 is negative because information and data on a travel route in which the hybrid vehicle HEV passes through a $CO_2$ recovery road 3 has not been received yet, the control routine illustrated in FIG. 8 ends temporarily without performing subsequent control.

On the other hand, when the determination result of Step S31 is positive because information and data on a travel route in which the hybrid vehicle HEV passes through a $CO_2$ recovery road 3 has been received, the control routine proceeds to Step S32.

In Step S32, a driver of the hybrid vehicle HEV is notified of the travel route passing through a $CO_2$ recovery road 3. For example, information on the travel route passing through a $CO_2$ recovery road 3 is displayed on a liquid crystal monitor of the notification device 15 or a head-up display. As guidance of a travel route or a destination on the navigation system, the set travel route passing through a $CO_2$ recovery road 3 is displayed on a display (not illustrated) of the navigation system. Alternatively, the information on the travel route passing through a $CO_2$ recovery road 3 is reproduced by the speaker of the notification device 15. A driver of the hybrid vehicle HEV may be notified of information on the travel route passing through a $CO_2$ recovery road 3 using both the monitor of the notification device 15 or the head-up display and the speaker.

In the embodiment illustrated in FIG. 15 which will be described later, in Step S32, for example, information on the travel route passing through a $CO_2$ recovery road 3 is displayed on a liquid crystal monitor of a notification unit 403 of the HMI device 400 which will be described later or a head-up display. As guidance of a travel route or a destination on the navigation system, the set travel route passing through a $CO_2$ recovery road 3 is displayed on a display (not illustrated) of the navigation system incorporated into the HMI device 400 which will be described later. Alternatively, the information on the travel route passing through a $CO_2$ recovery road 3 is reproduced by the speaker of the notification unit 403 of the HMI device 400 which will be described later. A driver of the hybrid vehicle HEV may be notified of information on the travel route passing through a $CO_2$ recovery road 3 using both the monitor of the notification unit 403 of the HMI device 400 which will be described later or the head-up display and the speaker.

After a driver of the hybrid vehicle HEV has been notified of the travel route passing through a $CO_2$ recovery road 3 in Step S32, the control routine illustrated in FIG. 8 ends temporarily.

Figure 9:
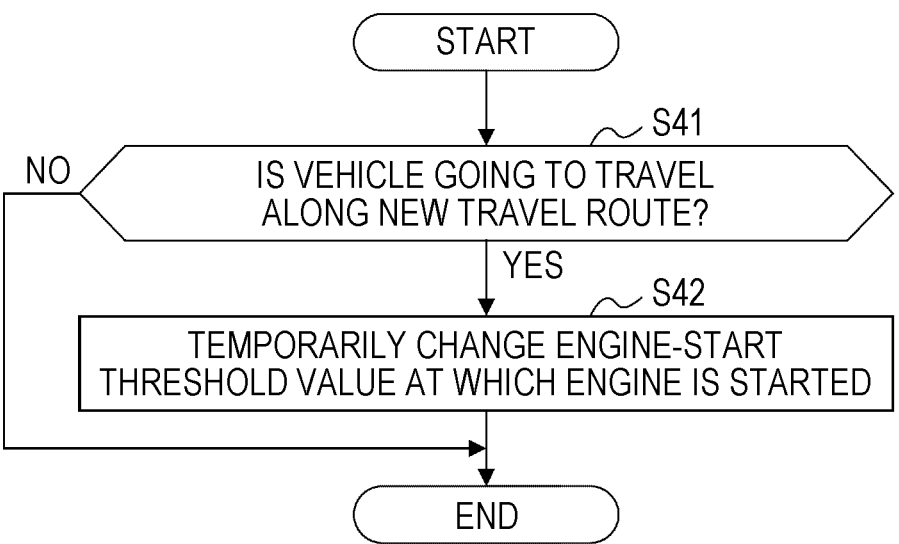
FIG. 9 is a flowchart illustrating an example of a control routine which is performed by the carbon dioxide recovery system according to the disclosure and particularly illustrating control details of temporarily decreasing an engine-start threshold value to delay an engine start timing until a hybrid vehicle traveling in a $CO_2$ recovery area reaches a $CO_2$ recovery road in which a stationary $CO_2$ recovery device is installed when the hybrid vehicle travels to the $CO_2$ recovery road.

In the control routine illustrated in the flowchart of FIG. 8, when the driver of the hybrid vehicle HEV is notified of the travel route passing through a $CO_2$ recovery road 3, a party performing notification of the travel route performs the control routine illustrated in the flowchart of FIG. 9. That is, the control routine illustrated in the flowchart of FIG. 9 is performed by the onboard controller 17 of the control unit 100 in the embodiment illustrated in FIG. 4. The control routine is performed by the control unit 200, that is, the first ECU 201 of the onboard controller 17, in the embodiment illustrated in FIG. 5. The control routine illustrated in the flowchart of FIG. 9 is performed by the control unit 300, that is, the first ECU 301 of the onboard controller 17, in the embodiment illustrated in FIG. 13 which will be described later.

In the flowchart illustrated in FIG. 9, in Step S41, it is determined whether the hybrid vehicle HEV is going to travel on the notified travel route passing through a $CO_2$ recovery road 3. That is, it is determined whether the driver of the hybrid vehicle HEV notified of the travel route passing through a $CO_2$ recovery road 3 drives the hybrid vehicle HEV to an installation place of a stationary $CO_2$ recovery device 2 along the notified travel route. For example, it is possible to determine a travel trend of the hybrid vehicle HEV in this case based on the position information of the hybrid vehicle HEV acquired from the GPS receiver 16$f$ or the like.

When the determination result of Step S41 is negative because the hybrid vehicle HEV does not travel along the notified travel route passing through a $CO_2$ recovery road 3, the control routine illustrated in the flowchart of FIG. 9 ends temporarily without performing subsequent control.

On the other hand, when the determination result of Step S41 is positive because the hybrid vehicle HEV is going to travel or is traveling along the notified travel route passing through a $CO_2$ recovery road 3, the control routine proceeds to Step S42.

Figure 10:
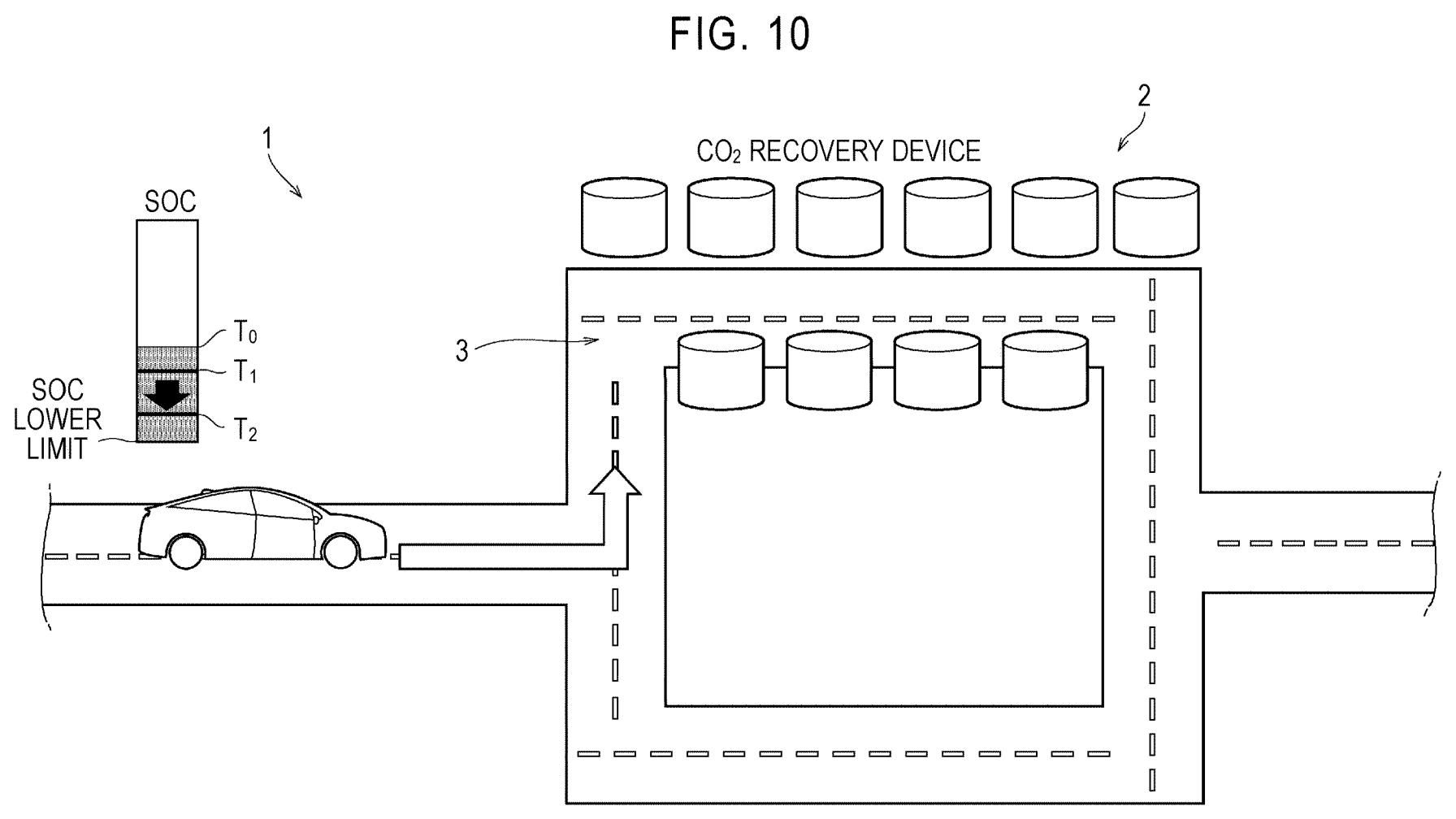

In Step S42, the engine-start threshold value $T_1$ for starting the engine 11 changes temporarily. Specifically, as illustrated by the SOC of the battery 14 in FIG. 10, the engine-start threshold value $T_1$ is temporarily set to an engine-start threshold value $T_2$ which is less than the normal engine-start threshold value $T_1$. Similarly to the SOC threshold value $T_0$, the engine-start threshold value $T_1$ is a threshold value for the SOC (or the residual charging capacity) of the battery 14 and is set to prevent over-discharging of the battery 14 and to protect the battery 14 in a normal state. Accordingly, when the SOC of the battery 14 of the hybrid vehicle HEV is equal to or less than the engine-start threshold value $T_1$ in a state in which the engine 11 is stopped, the engine 11 is started to protect the battery 14. Then, when the engine 11 operates and electric power is generated by the motor 12 which is driven by the engine 11, the battery 14 is charged. The engine-start threshold value $T_1$ is set to a value which is greater by a predetermined margin (or a safety factor) than an allowable lower limit of the SOC of the battery 14 in consideration of the predetermined margin from the lower limit of the SOC based on the premise of a normal travel state. In Step S41, the engine-start threshold value $T_1$ decreases to the engine-start threshold value $T_2$ less than the engine-start threshold value $T_1$ in a range of the predetermined margin temporarily, that is, until the hybrid vehicle HEV reaches the $CO_2$ recovery road 3.

As described above, by temporarily setting the engine-start threshold value $T_1$ to the less engine-start threshold value $T_2$, the timing at which the engine 11 is started is delayed when the SOC of the battery 14 decreases. Accordingly, when the SOC of the battery 14 of the hybrid vehicle HEV traveling in a $CO_2$ recovery area 1 has decreased and the hybrid vehicle HEV is traveling to the $CO_2$ recovery road 3, the timing at which the engine 11 is started can be delayed. As a result, it is possible to prevent the engine 11 from being started before the hybrid vehicle HEV reaches the $CO_2$ recovery road 3. Accordingly, it is possible to increase a frequency or proportion at which the engine 11 is operated when the hybrid vehicle HEV travels on the $CO_2$ recovery road 3. As a result, it is possible to effectively reduce an amount of carbon dioxide discharged from the hybrid vehicle HEV to the atmosphere.

After the engine-start threshold value $T_1$ has changed temporarily to the engine-start threshold value $T_2$ less than the engine-start threshold value $T_1$ in Step S42, the control routine illustrated in the flowchart of FIG. 8 ends temporarily. For example, when a distance between the current position of the hybrid vehicle HEV and a $CO_2$ recovery road 3 on the notified travel route is small and the hybrid vehicle HEV reliably reaches the $CO_2$ recovery road 3 before the SOC of the battery 14 becomes equal to or less than the normal engine-start threshold value $T_1$, the control process of Step S42 may be skipped.

Figure 11:
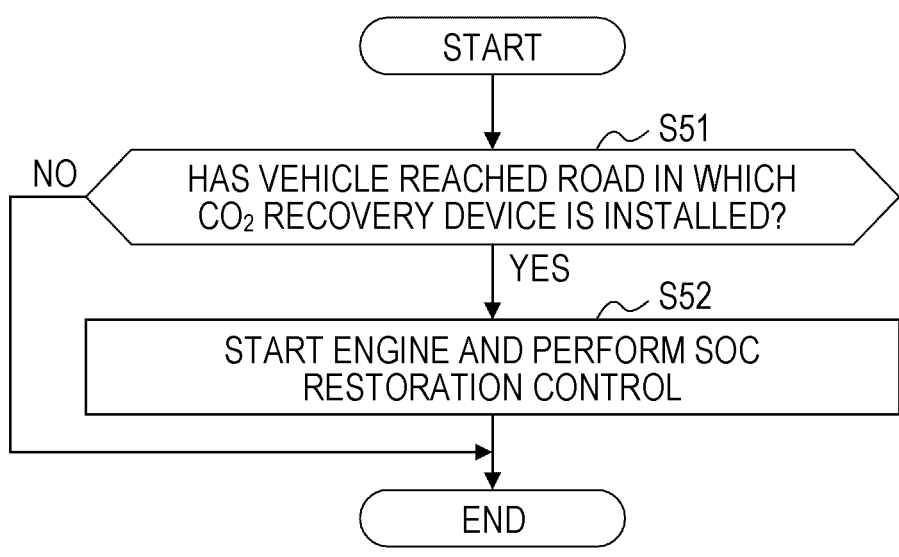
FIG. 11 is a flowchart illustrating an example of a control routine which is performed by the carbon dioxide recovery system according to the disclosure and particularly illustrating control details of performing SOC restoration control by starting an engine when a hybrid vehicle guided to a $CO_2$ recovery road reaches the $CO_2$ recovery road.

In the control routine illustrated in the flowchart of FIG. 9, when the engine-start threshold value $T_1$ changes temporarily to the engine-start threshold value $T_2$ less than the engine-start threshold value $T_1$, a party performing change of the engine-start threshold value $T_1$ performs the control routine illustrated in the flowchart of FIG. 11. That is, the control routine illustrated in the flowchart of FIG. 11 is performed by the onboard controller 17 of the control unit 100 in the embodiment illustrated in FIG. 4. The control routine is performed by the control unit 200, that is, the first ECU 201 of the onboard controller 17, in the embodiment illustrated in FIG. 5. The control routine illustrated in the flowchart of FIG. 11 is performed by the control unit 300, that is, the first ECU 301 of the onboard controller 17, in the embodiment illustrated in FIG. 13 which will be described later.

In the flowchart illustrated in FIG. 11, in Step S51, it is determined whether the hybrid vehicle HEV has reached the $CO_2$ recovery road 3. That is, it is determined whether the driver of the hybrid vehicle HEV drives the hybrid vehicle HEV along the notified travel route passing through the $CO_2$ recovery road 3 and the hybrid vehicle HEV has actually reached the $CO_2$ recovery road 3. For example, whether the hybrid vehicle HEV has reached the $CO_2$ recovery road 3 can be determined based on the position information of the hybrid vehicle HEV acquired from the GPS receiver 16$f$, outside conditions of the hybrid vehicle HEV acquired by the onboard camera 16$g$, and the like.

When the determination result of Step S51 is negative because the hybrid vehicle HEV has not yet reached the $CO_2$ recovery road 3, the control routine illustrated in FIG. 11 ends temporarily without performing subsequent control.

On the other hand, when the determination result of Step S51 is positive because the hybrid vehicle HEV has reached the $CO_2$ recovery road 3, the control routine proceeds to Step S52.

In Step S52, the engine 11 of the hybrid vehicle HEV is started and SOC restoration control is performed. The SOC restoration control is control for forcibly starting the engine 11 to charge the battery 14 in order to prevent over-discharging of the battery 14 and to protect the battery 14 when the SOC (residual charging capacity) of the battery 14 of the hybrid vehicle HEV has decreased. The battery 14 is charged with electric power generated by operating the engine 11 and driving the motor 12 using the engine 11. In the embodiment of the disclosure, the SOC restoration control is performed when the SOC of the battery 14 is equal to or less than the engine-start threshold value $T_1$ in a normal state (for example, a state in which the hybrid vehicle HEV is traveling outside a $CO_2$ recovery area 1) as described above. In addition, the SOC restoration control is performed when the hybrid vehicle HEV is traveling in a $CO_2$ recovery area 1, the SOC of the battery 14 is equal to or less than the SOC threshold value $T_0$, and the hybrid vehicle HEV is guided to a $CO_2$ recovery road 3 and is traveling on the $CO_2$ recovery road 3.

After the engine 11 of the hybrid vehicle HEV has been started and the SOC restoration control has been performed in Step S52, the control routine illustrated in the flowchart of FIG. 11 ends temporarily.

In the carbon dioxide recovery system according to the embodiment of the disclosure, as described above, when a hybrid vehicle HEV travels on a $CO_2$ recovery road 3, an incentive may be given to a driver (an occupant) of the hybrid vehicle HEV. Specifically, the control routine illustrated in the flowchart of FIG. 12 is performed.

Figure 12:
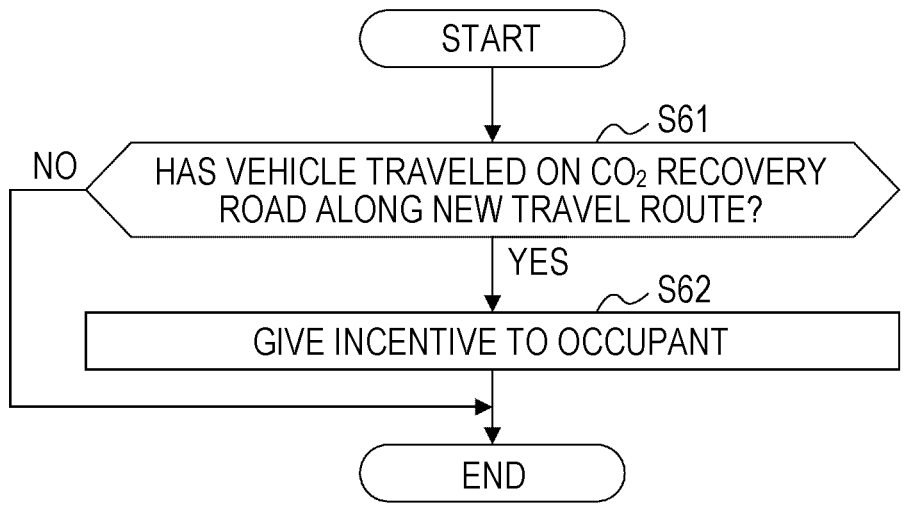
FIG. 12 is a flowchart illustrating an example of a control routine which is performed by the carbon dioxide recovery system according to the disclosure and particularly illustrating control details of giving an incentive to an occupant (a driver) of a hybrid vehicle when the hybrid vehicle travels along a notified travel route passing through a $CO_2$ recovery road and carbon dioxide discharged from an engine is recovered on the $CO_2$ recovery road.

The control routine illustrated in the flowchart of FIG. 12 is performed, for example, by the server 21 of the control unit 100 in the embodiment illustrated in FIG. 4. The control routine is performed by the control unit 200, that is, the second ECU 202 of the onboard controller 17, in the embodiment illustrated in FIG. 5. The control routine illustrated in the flowchart of FIG. 12 is performed by the control unit 300, that is, the second ECU 302 of the onboard controller 17, in the embodiment illustrated in FIG. 13 which will be described later. This control routine is performed by the second ECU 402 of the HMI device 400 in the embodiment illustrated in FIG. 15 which will be described later.

In the flowchart illustrated in FIG. 12, in Step S61, it is determined whether the hybrid vehicle HEV has traveled on a $CO_2$ recovery road 3 along a new travel route. Specifically, it is determined whether the hybrid vehicle HEV has traveled along the travel route (a new travel route) passing through a $CO_2$ recovery road 3 notified and guided for the driver of the hybrid vehicle HEV when the SOC of the battery 14 of the hybrid vehicle HEV traveling in a $CO_2$ recovery area 1 has decreased. For example, whether the hybrid vehicle HEV has traveled on the $CO_2$ recovery road 3 along the new travel route can be determined based on the position information of the hybrid vehicle HEV acquired from the GPS receiver 16f, the outside conditions of the hybrid vehicle HEV acquired by the onboard camera 16g, and the like.

When the determination result of Step S61 is negative because the hybrid vehicle HEV has not yet traveled on the $CO_2$ recovery road 3 along the new travel route, the control routine illustrated in the flowchart of FIG. 12 ends temporarily without performing subsequent control.

On the other hand, when the determination result of Step S61 is positive because the hybrid vehicle HEV has traveled on the $CO_2$ recovery road 3 along the new travel route, the control routine proceeds to Step S62.

In Step S62, an incentive is given to the driver (or an occupant, an owner, or the like) of the hybrid vehicle HEV. For example, the incentive in this case is not limited to money such as a reward or an incentive but may be equivalents to money such as electronic money, points, gift certificates, discount coupons, commodities, or cryptocurrency.

When an incentive is given to the driver (or an occupant, an owner, or the like) of the hybrid vehicle HEV in Step S62, the control routine illustrated in the flowchart of FIG. 12 ends temporarily.

In this way, by constructing a system that gives an incentive to a driver (an occupant) of a hybrid vehicle HEV when the hybrid vehicle HEV has traveled on a $CO_2$ recovery road 3, it is possible to provide motivation for traveling on a $CO_2$ recovery road 3 to the driver (occupant) of the hybrid vehicle. Accordingly, when the SOC of the battery 14 of the hybrid vehicle HEV traveling in a $CO_2$ recovery area 1 has decreased as described above, it is possible to notify a driver of the hybrid vehicle HEV of a travel route (a new travel route) passing through a $CO_2$ recovery road 3 and prompt the hybrid vehicle HEV to travel as guided. As a result, it is possible to increase a frequency or proportion at which the engine 11 is operated when the hybrid vehicle HEV is traveling on the $CO_2$ recovery road 3. Accordingly, it is possible to effectively reduce an amount of carbon dioxide discharged from the hybrid vehicle HEV to the atmosphere.

The carbon dioxide recovery system according to the embodiment of the disclosure employs a hybrid vehicle HEV that can travel by automated driving as a control target. For example, a control system, a communication system, and the like associated with a control unit 300 for a hybrid vehicle HEV that can travel by automated driving are illustrated in the block diagram of FIG. 13.

The control unit 300 comprehensively controls a hybrid vehicle HEV that can travel by automated driving in which a driving operation is automatically controlled. Particularly, the control unit 300 according to the embodiment of the disclosure guides a hybrid vehicle HEV to a $CO_2$ recovery road 3 as described above when the engine 11 of the hybrid vehicle HEV traveling by automated driving in a $CO_2$ recovery area 1 is operated or when the engine 11 of the hybrid vehicle HEV traveling by automated driving in a $CO_2$ recovery area 1 is predicted to be operated. Specifically, when the hybrid vehicle HEV travels in a $CO_2$ recovery area 1 by automated driving and the residual charging capacity (SOC) of the battery 14 is equal to or less than the SOC threshold value $T_0$ or the residual charging capacity (SOC) of the battery 14 is predicted to be equal to or less than the SOC threshold value $T_0$, the control unit 300 performs control such that the hybrid vehicle HEV travels on a $CO_2$ recovery road 3. For example, a travel plan for automated driving (a scheduled travel route) is set or changed such that the hybrid vehicle HEV travels on the $CO_2$ recovery road 3.

Figure 13:
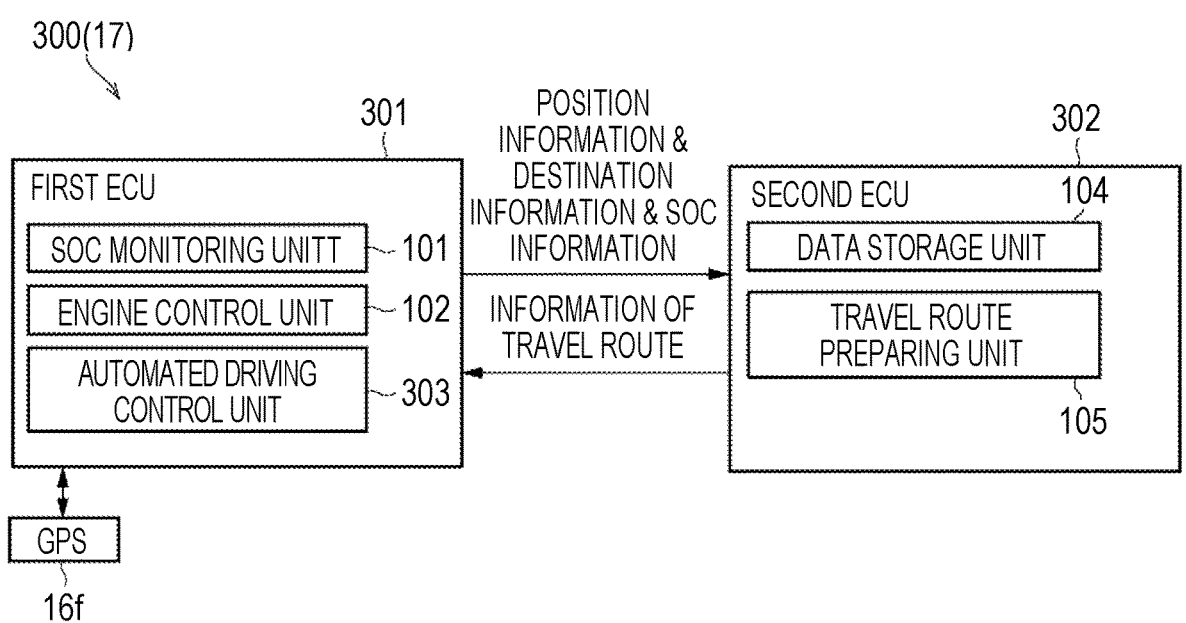
FIG. 13 is a block diagram illustrating the configuration of the carbon dioxide recovery system according to the disclosure and illustrating a control unit including an onboard controller (a first EC and a second ECU) mounted in a hybrid vehicle which can travel by automated driving and a control system, a communication system, and the like associated with the control unit.

In the embodiment illustrated in FIG. 13, the control unit 300 includes the first ECU 301 and the second ECU 302 which are mounted in the hybrid vehicle HEV as the onboard controller 17. The first ECU 301 and the second ECU 302 are connected to enable transmission and reception of information and data. In the control unit 300 illustrated in FIG. 13, the same elements in functions or control details as in the control unit 100 illustrated in FIG. 4 or the control unit 200 illustrated in FIG. 5 are referred to by the same reference signs as in FIGS. 4 and 5.

An example of the control unit 300 including two onboard controllers 17 such as the first ECU 301 and the second ECU 302 is illustrated in FIG. 13, but, for example, the first ECU 301 and the second ECU 302 may be unified as the control unit according to the embodiment of the disclosure. Alternatively, for example, the control unit may include three or more onboard controllers 17 for each of control details or each control target.

Similarly to the control unit 100 and the control unit 200, the control unit 300 includes a SOC monitoring unit 101, an engine control unit 102, a data storage unit 104, and a travel route preparing unit 105. The control unit 300 further includes an automated driving control unit 303. In the embodiment illustrated in FIG. 13, the SOC monitoring unit 101, the engine control unit 102, and the automated driving control unit 303 are provided in the first ECU 301 of the onboard controller 17. On the other hand, the data storage unit 104 and the travel route preparing unit 105 are provided in the second ECU 302 of the onboard controller 17.

The automated driving control unit 303 generates a course of the hybrid vehicle HEV (a travel route in which the hybrid vehicle HEV travels along a target route), for example, based on image information of the onboard camera 16g (external conditions), detection data from a so-called radio detection and ranging (RADAR) (not illustrated), a so-called laser imaging detection and ranging (LIDAR) (not illustrated), an ultrasonic sensor (not illustrated), and the like, a target route calculated by a navigation system (not illustrated), and position information (a current position) of the hybrid vehicle HEV. The automated driving control unit 303 creates a travel plan along the generated course such that the hybrid vehicle HEV can travel appropriately according to criteria such as safe travel on the target route, travel based on the rules, efficient travel, and the like. The automated driving control unit 303 automatically controls travel of the hybrid vehicle HEV based on the created travel plan. That is, the automated driving control unit 303 realizes travel by automated driving of the hybrid vehicle HEV by automatically controlling a driving operation of the hybrid vehicle HEV.

An example of control for causing a hybrid vehicle HEV to travel by automated driving based on the travel plan is described in Japanese Unexamined Patent Application Publication No. 2016-99713 (JP 2016-99713 A). For example, a hybrid vehicle HEV that can travel by automated driving in the embodiment of the disclosure is configured to travel by advanced automated driving or complete automated driving corresponding to "Level 4" of automation levels established by the National Highway Traffic Safety Administration (NHTSA) or "Level 4" and "Level 5" of automation levels established by the Society of Automotive Engineers (SAE) of U.S.A by employing details described in JP 2016-99713 A or other control techniques associated with automated driving.

In the carbon dioxide recovery system according to the embodiment of the disclosure, the control routines illustrated in FIGS. 6, 7, 9, 11, and 12 can be performed on a hybrid vehicle HEV traveling by automated driving illustrated in FIG. 13 as a control target. In the embodiment illustrated in FIG. 13, the control routine illustrated in the flowchart of FIG. 14 is performed instead of the control routine illustrated in the flowchart of FIG. 8 in a hybrid vehicle HEV traveling by automated driving.

Figure 14:
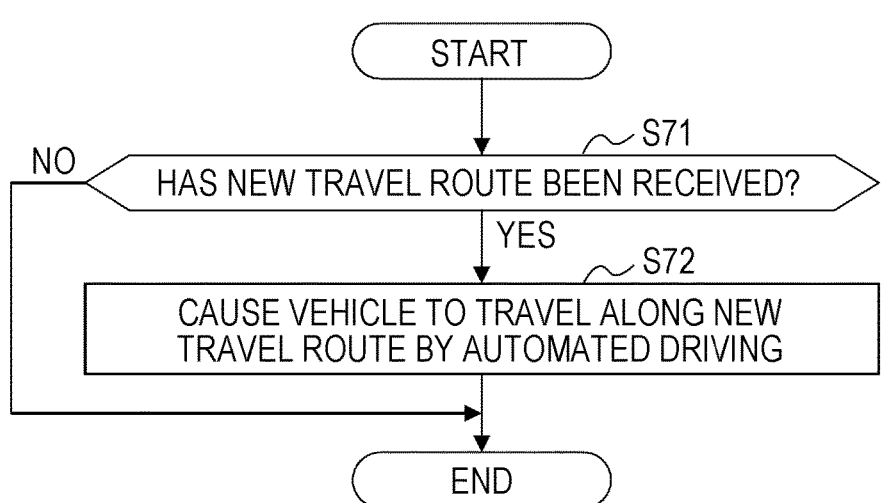
FIG. 14 is a flowchart illustrating an example of a control routine which is performed by the carbon dioxide recovery system according to the disclosure and particularly illustrating control details of causing a hybrid vehicle to travel by automated driving on a set travel route passing through a set $CO_2$ recovery road.

The control routine illustrated in the flowchart of FIG. 14 is performed by the control unit 300, that is, the first ECU 301 of the onboard controller 17.

In the flowchart illustrated in FIG. 14, in Step S71, it is determined whether the first ECU 301 of the control unit 300 has received information and data on a travel route in which the hybrid vehicle HEV traveling by automated driving passes through a $CO_2$ recovery road 3.

When the determination result of Step S71 is negative because information and data on a travel route in which the hybrid vehicle HEV traveling by automated driving passes through a $CO_2$ recovery road 3 has not yet been received, the control routine illustrated in the flowchart of FIG. 14 ends temporarily without performing subsequent control.

On the other hand, when the determination result of Step S71 is positive because information and data on a travel route in which the hybrid vehicle HEV traveling by automated driving passes through a $CO_2$ recovery road 3 has been received, the control routine proceeds to Step S72.

In Step S72, control is performed such that the hybrid vehicle HEV traveling by automated driving travels along the travel route passing through a $CO_2$ recovery road 3. For example, a travel plan for automated driving (a scheduled travel route) is set or changed such that the hybrid vehicle HEV travels on the $CO_2$ recovery road 3.

After control has been performed in Step S72 such that the hybrid vehicle HEV traveling by automated driving travels along the travel route passing through the $CO_2$ recovery road 3, the control routine illustrated in the flowchart of FIG. 14 ends temporarily.

In this way, in the carbon dioxide recovery system according to the embodiment of the disclosure, for example, when the hybrid vehicle HEV is an automated-driving vehicle which is automatically driven based on a travel plan (a scheduled travel route), control is performed such that the hybrid vehicle HEV traveling by automated driving travels to the $CO_2$ recovery road 3. Specifically, when the residual charging capacity (SOC) of the battery 14 of the hybrid vehicle HEV (automated-driving vehicle) traveling in a $CO_2$ recovery area 1 is equal to or less than the SOC threshold value $T_0$ or when the residual charging capacity (SOC) of the battery 14 is predicted to be equal to or less than the SOC threshold value $T_0$, control is performed such that the hybrid vehicle HEV traveling by automated driving travels on the $CO_2$ recovery road 3. For example, a travel plan for automated driving is set. Alternatively the travel plan for automated driving is changed.

Accordingly, with the carbon dioxide recovery system according to the embodiment of the disclosure, when the residual charging capacity (SOC) of the battery 14 of the hybrid vehicle HEV traveling by automated driving is low and the engine 11 needs to be operated, a travel plan for automated driving can be set or changed such that the hybrid vehicle HEV traveling by automated driving travels on a $CO_2$ recovery road 3 beforehand. Accordingly, it is possible to operate the engine 11 when the hybrid vehicle BEV traveling by automated driving travels on a $CO_2$ recovery road 3 and to efficiently recover carbon dioxide discharged from the engine 11 at that time on the $CO_2$ recovery road 3.

The carbon dioxide recovery system according to the embodiment of the disclosure includes a so-called HMI device mounted in a hybrid vehicle HEV. The hybrid vehicle HEV in which the HMI device is mounted can be employed as a control target. For example, a control system, a communication system, and the like associated with the HMI device 400 mounted in a hybrid vehicle HEV are illustrated in the block diagram of FIG. 15.

The HMI device 400 comprehensively controls the hybrid vehicle HEV. Particularly, the HMI device 400 according to the embodiment of the disclosure guides the hybrid vehicle HEV to a $CO_2$ recovery road 3 when the engine 11 of the hybrid vehicle HEV traveling in a $CO_2$ recovery area 1 is operated or when the engine 11 of the hybrid vehicle HEV traveling in the $CO_2$ recovery area 1 is predicted to be operated. Specifically, as described above, when the hybrid vehicle HEV is traveling in a $CO_2$ recovery area 1 and the residual charging capacity (SOC) of the battery 14 is equal to or less than the SOC threshold value $T_0$ or when the residual charging capacity (SOC) of the battery 14 is predicted to be equal to or less than the SOC threshold value $T_0$, the HMI device 400 guides the hybrid vehicle HEV to travel on a $CO_2$ recovery road 3. For example, a driver of the hybrid vehicle HEV is notified of information or an instruction for prompting the hybrid vehicle HEV to travel on a $CO_2$ recovery road 3.

Figure 15:
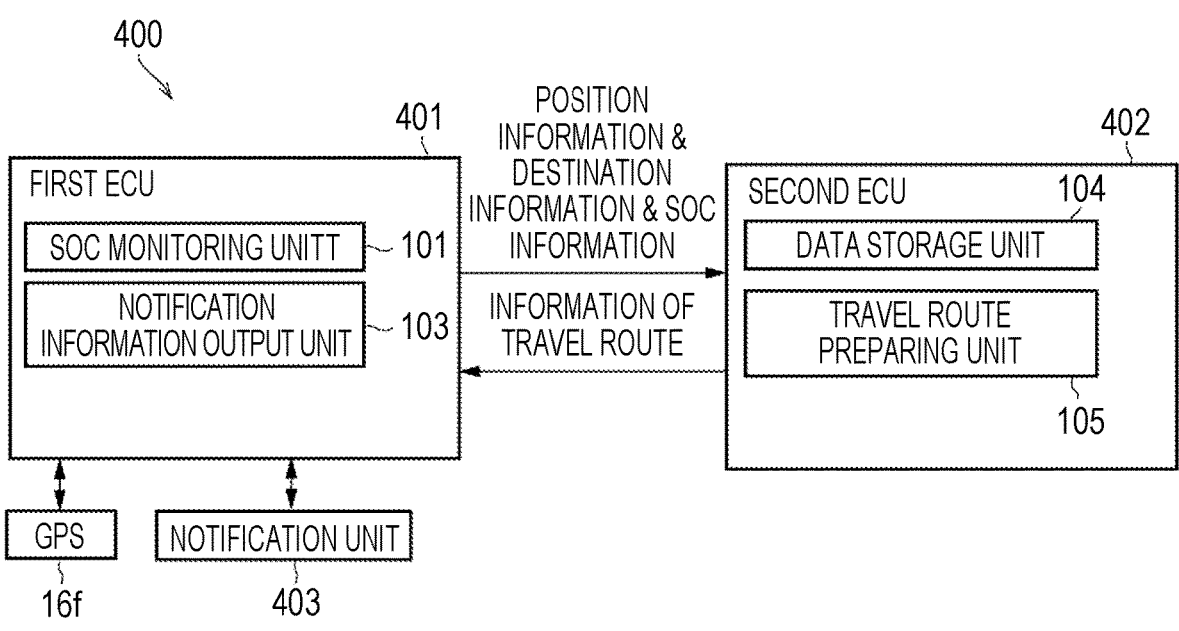
FIG. 15 is a block diagram illustrating the configuration of the carbon dioxide recovery system according to the disclosure and illustrating an HMI device mounted in a hybrid vehicle and a control system, a communication system, and the like associated with the HMI device.

In the embodiment illustrated in FIG. 15, the HMI device 400 includes, for example, two elements such as the first ECU 401 and the second ECU 402. The first ECU 401 and the second ECU 402 are connected to enable transmission and reception of information and data. In the HMI device 400 illustrated in FIG. 15, the same elements in functions, control details, and the like as in the control unit 100 illustrated in FIG. 4 or the control unit 200 illustrated in FIG. 5 are referred to by the same reference signs as in FIGS. 4 and 5.

An example of the HMI device 400 including two control units (ECUs) such as the first ECU 401 and the second ECU 402 is illustrated in FIG. 15, but, for example, the first ECU 401 and the second ECU 402 may be unified in the HMI device 400 according to the embodiment of the disclosure. Alternatively, for example, the HMI device 400 may include three or more control units (ECUs) for each of control details or for each control target.

Similarly to the control unit 100 and the control unit 200, the HMI device 400 includes an SOC monitoring unit 101, a notification information output unit 103, a data storage unit 104, and a travel route preparing unit 105. The HMI device 400 further includes a notification unit 403. In the embodiment illustrated in FIG. 15, the SOC monitoring unit 101 and the notification information output unit 103 are provided in the first ECU 401. The notification unit 403 is connected to the first ECU 401. On the other hand, the data storage unit 104 and the travel route preparing unit 105 are provided in the second ECU 402.

The notification unit 403 is a device or instrument that notifies a driver of the hybrid vehicle HEV of predetermined information such as a display (or a monitor), a touch panel, or a speaker. The notification unit 403 may be shared by the notification device 15 of the hybrid vehicle HEV. Alternatively, the notification unit 403 may be provided as a dedicated notification device of the HMI device 400.

The carbon dioxide recovery system according to the embodiment of the disclosure can perform the control routines illustrated in the flowcharts of FIGS. 6, 7, 8, and 12 on a hybrid vehicle HEV in which the HMI device 400 illustrated in FIG. 15 is mounted as a control target. That is, by mounting the HMI device 400 illustrated in FIG. 15 in the hybrid vehicle HEV, it is possible to perform almost the same control as the hybrid vehicle HEV in the embodiment illustrated in FIG. 4 or 5.

In this way, the HMI device 400 used to transmit and receive information and signals between a hybrid vehicle HEV and a driver of the hybrid vehicle HEV may be provided in the carbon dioxide recovery system according to the embodiment of the disclosure. The HMI device 400 includes the notification unit 403 that that notifies a driver of the hybrid vehicle HEV of predetermined information such as a display (or a monitor), a touch panel, or a speaker, and, for example, causes the notification unit 403 to display an image or a video on the monitor such that the driver recognizes the predetermined information. Alternatively, the notification unit 403 allows the driver to recognize the predetermined information by reproducing voice guidance from the speaker. The HMI device 400 acquires the residual charging capacity (SOC) of the battery 14 of the hybrid vehicle HEV and position information of the hybrid vehicle HEV and notifies a driver of the hybrid vehicle HEV of information or an instruction for prompting the hybrid vehicle HEV to travel on a $CO_2$ recovery road 3 when the hybrid vehicle HEV is traveling in a $CO_2$ recovery area 1 and the residual charging capacity (SOC) of the battery 14 is equal to or less than the SOC threshold value $T_0$ or the residual charging capacity (SOC) of the battery 14 is predicted to be equal to or less than the SOC threshold value $T_0$. Accordingly, by mounting the HMI device 400 of the carbon dioxide recovery system according to the embodiment of the disclosure in a hybrid vehicle HEV, it is possible to easily guide the hybrid vehicle HEV in which the residual charging capacity of the battery 14 is low and the engine 11 needs to be operated such that the hybrid vehicle HEV travels on a $CO_2$ recovery road 3 beforehand, that is, before the engine 11 is actually operated. Accordingly, it is possible to operate the engine 11 when the hybrid vehicle HEV travels on a $CO_2$ recovery road 3 and to efficiently recover carbon dioxide discharged at that time on the $CO_2$ recovery road 3.

As described above, the carbon dioxide recovery system according to the embodiment of the disclosure recovers carbon dioxide discharged from a hybrid vehicle HEV traveling in a $CO_2$ recovery area 1. A $CO_2$ recovery road 3 including a stationary $CO_2$ recovery device 2 is constructed in the $CO_2$ recovery area 1, and the stationary $CO_2$ recovery device 2 collects and recovers carbon dioxide discharged from the engine 11 of a hybrid vehicle HEV when the hybrid vehicle HEV is traveling on the $CO_2$ recovery road 3. For example, the carbon dioxide recovery system according to the embodiment of the disclosure notifies a driver of the hybrid vehicle HEV of information or an instruction for prompting the hybrid vehicle HEV to travel on a $CO_2$ recovery road 3 via the notification device 15 (or the notification unit 403 of the HMI device 400) when the residual charging capacity (SOC) of the battery 14 of the hybrid vehicle HEV traveling in a $CO_2$ recovery area 1 is equal to or less than the SOC threshold value $T_0$ or when the residual charging capacity (SOC) of the battery 14 is predicted to be equal to or less than the SOC threshold value $T_0$. Accordingly, the hybrid vehicle HEV is guided to travel on the $CO_2$ recovery road 3. Accordingly, with the carbon dioxide recovery system according to the embodiment of the disclosure, it is possible to guide a hybrid vehicle HEV in which the residual charging capacity (SOC) of the battery 14 is low and the engine 11 needs to be operated such that the hybrid vehicle HEV travels on a $CO_2$ recovery road 3 beforehand. Accordingly, it is possible to operate the engine 11 when the hybrid vehicle HEV is traveling on the $CO_2$ recovery road 3 and to efficiently recover carbon dioxide discharged from the engine 11 at that time on the $CO_2$ recovery road 3. As a result, it is possible to effectively reduce an amount of carbon dioxide discharged from the hybrid vehicle HEV to the atmosphere and to contribute to reduction of global warming.

What is claimed is:

1. A carbon dioxide recovery system that recovers carbon dioxide discharged from an engine of a hybrid vehicle, which includes a plurality of power sources including the engine and a motor and a battery transmitting and receiving electric power to and from the motor, the carbon dioxide recovery system recovering carbon dioxide from the hybrid vehicle traveling in a $CO_2$ recovery area including a $CO_2$ recovery road in which a stationary $CO_2$ recovery device including hardware that is configured to collect and recover carbon dioxide from the atmosphere is provided, wherein the $CO_2$ recovery area includes the $CO_2$ recovery road, in which the stationary $CO_2$ recovery device is installed, and a first road, in which the stationary $CO_2$ recovery device is not installed, and the $CO_2$ recovery area is defined as a region within a predetermined distance from a location where the $CO_2$ recovery road is constructed;

wherein the $CO_2$ recovery road is provided in a tunnel or forms an underpass in which the stationary $CO_2$ recovery device is installed, wherein the hybrid vehicle includes processing circuitry configured to:

acquire at least a residual charging capacity of the battery and position information of the hybrid vehicle, and control an operation of the engine;

notify a driver of the hybrid vehicle of information about the hybrid vehicle;

guide the hybrid vehicle such that the hybrid vehicle travels on the $CO_2$ recovery road using the notification device when the residual charging capacity is equal to or less than a predetermined state of charge (SOC) threshold value or when the residual charging capacity is predicted to be equal to or less than the SOC threshold value while the hybrid vehicle is traveling in the $CO_2$ recovery area, wherein the SOC threshold value is set in advance based on characteristics of a travel route of the hybrid vehicle; and operate the engine when the residual charging capacity is equal to or less than an engine-start threshold value, wherein the SOC threshold value is set so that, when the hybrid vehicle travels a first distance on the power of the battery after the residual charging capacity becomes less than the SOC threshold value, the residual charging capacity becomes less than the engine-start threshold value, wherein the first distance is a fixed distance that is set in advance regardless of the travel route of the hybrid vehicle, wherein the processing circuitry is further configured to:

charge the battery by causing the motor to generate electric power when the residual charging capacity is equal to or less than a first engine-start threshold value while the hybrid vehicle is traveling outside the $CO_2$ recovery area;

set a threshold for operating the engine to a second engine-start threshold value, in a case where the hybrid vehicle is traveling on the first road in the $CO_2$ recovery area and the residual charging capacity has become equal to or less than the SOC threshold value or is predicted to become equal to or less than the SOC threshold value; and operate the engine when the residual charging capacity is equal to or less than the second engine-start threshold value and the hybrid vehicle travels to the $CO_2$ recovery road, wherein the second engine-start threshold value is less than the first engine-start threshold value.

2. The carbon dioxide recovery system according to claim 1, wherein the processing circuitry is further configured to operate the engine and charge the battery by causing the motor to generate electric power while the hybrid vehicle is traveling on the $CO_2$ recovery road.

3. The carbon dioxide recovery system according to claim 1, wherein the processing circuitry is further configured to:

determine whether the $CO_2$ recovery road is within a predetermined range of a traveling point predicted after the hybrid vehicle has traveled the first distance while the hybrid vehicle is traveling outside the $CO_2$ recovery area; and when it is determined that the $CO_2$ recovery road is within the predetermined range, control the hybrid vehicle to travel on the $CO_2$ recovery road.

4. A carbon dioxide recovery system that recovers carbon dioxide discharged from an engine of a hybrid vehicle, which includes a plurality of power sources including the engine and a motor and a battery transmitting and receiving electric power to and from the motor, the carbon dioxide recovery system recovering carbon dioxide from the hybrid vehicle traveling in a $CO_2$ recovery area including a $CO_2$ recovery road in which a stationary $CO_2$ recovery device including hardware that is configured to collect and recover carbon dioxide from the atmosphere is provided, wherein the $CO_2$ recovery area includes the $CO_2$ recovery road, in which the stationary $CO_2$ recovery device is installed, and a first road, in which the stationary $CO_2$ recovery device is not installed, and the $CO_2$ recovery area is defined as a region within a predetermined distance from a location where the $CO_2$ recovery road is constructed;

wherein the $CO_2$ recovery road is provided in a tunnel or forms an underpass in which the stationary $CO_2$ recovery device is installed, wherein the hybrid vehicle is an automated driving vehicle that is able to travel by automated driving for enabling the hybrid vehicle to travel under automatic control of a driving operation, wherein the hybrid vehicle includes processing circuitry configured to:

acquire at least a residual charging capacity of the battery and position information of the hybrid vehicle, and control the driving operation and an operation of the engine;

control the hybrid vehicle such that the hybrid vehicle travels on the $CO_2$ recovery road when the residual charging capacity is equal to or less than a predetermined state of charge (SOC) threshold value or when the residual charging capacity is predicted to be equal to or less than the SOC threshold value while the hybrid vehicle is traveling in the $CO_2$ recovery area by the automated driving, wherein the SOC threshold value is set in advance based on characteristics of a travel route of the hybrid vehicle; and operate the engine when the residual charging capacity is equal to or less than an engine-start threshold value, wherein the SOC threshold value is set so that, when the hybrid vehicle travels a first distance on the power of the battery after the residual charging capacity becomes less than the SOC threshold value, the residual charging capacity becomes less than the engine-start threshold value, wherein the first distance is a fixed distance that is set in advance regardless of the travel route of the hybrid vehicle, wherein the processing circuitry is further configured to:

charge the battery by causing the motor to generate electric power when the residual charging capacity is equal to or less than a first engine-start threshold value while the hybrid vehicle is traveling outside the $CO_2$ recovery area;

set a threshold for operating the engine to a second engine-start threshold value, in a case where the hybrid vehicle is traveling on the first road in the $CO_2$ recovery area and the residual charging capacity has become equal to or less than the SOC threshold value or is predicted to become equal to or less than the SOC threshold value; and operate the engine when the residual charging capacity is equal to or less than the second engine-start threshold value and the hybrid vehicle travels to the $CO_2$ recovery road, wherein the second engine-start threshold value is less than the first engine-start threshold value.

5. A carbon dioxide recovery system that recovers carbon dioxide discharged from an engine of a hybrid vehicle, which includes a plurality of power sources including the engine and a motor and a battery transmitting and receiving electric power to and from the motor, the carbon dioxide recovery system recovering carbon dioxide from the hybrid vehicle traveling in a $CO_2$ recovery area including a $CO_2$ recovery road in which a stationary $CO_2$ recovery device including hardware that is configured to collect and recover carbon dioxide from the atmosphere is provided, wherein the $CO_2$ recovery area includes the $CO_2$ recovery road, in which the stationary $CO_2$ recovery device is installed, and a first road, in which the stationary $CO_2$ recovery device is not installed, and the $CO_2$ recovery area is defined as a region within a predetermined distance from a location where the $CO_2$ recovery road is constructed;

wherein the $CO_2$ recovery road is provided in a tunnel or forms an underpass in which the stationary $CO_2$ recovery device is installed, wherein the hybrid vehicle includes processing circuitry configured to:

enable the hybrid vehicle and a driver of the hybrid vehicle to transmit and receive information and signals, and notify the driver of predetermined information;

acquire at least a residual charging capacity of the battery and position information of the hybrid vehicle;

notify the driver of information for guiding the hybrid vehicle such that the hybrid vehicle travels on the $CO_2$ recovery road when the residual charging capacity is equal to or less than a predetermined state of charge (SOC) threshold value or when the residual charging capacity is predicted to be equal to or less than the SOC threshold value while the hybrid vehicle is traveling in the $CO_2$ recovery area, wherein the SOC threshold value is set in advance based on characteristics of a travel route of the hybrid vehicle; and operate the engine when the residual charging capacity is equal to or less than an engine-start threshold value, wherein the SOC threshold value is set so that, when the hybrid vehicle travels a first distance on the power of the battery after the residual charging capacity becomes less than the SOC threshold value, the residual charging capacity becomes less than the engine-start threshold value, wherein the first distance is a fixed distance that is set in advance regardless of the travel route of the hybrid vehicle, wherein the processing circuitry is further configured to:

charge the battery by causing the motor to generate electric power when the residual charging capacity is equal to or less than a first engine-start threshold value while the hybrid vehicle is traveling outside the $CO_2$ recovery area;

set a threshold for operating the engine to a second engine-start threshold value, in a case where the hybrid vehicle is traveling on the first road in the $CO_2$ recovery area and the residual charging capacity has become equal to or less than the SOC threshold value or is predicted to become equal to or less than the SOC threshold value; and operate the engine when the residual charging capacity is equal to or less than the second engine-start threshold value and the hybrid vehicle travels to the $CO_2$ recovery road, wherein the second engine-start threshold value is less than the first engine-start threshold value.

* * * * *